(12) United States Patent
Knischka et al.

(10) Patent No.: US 8,658,741 B2
(45) Date of Patent: Feb. 25, 2014

(54) PROCESS FOR THE POST-MODIFICATION OF HOMO AND COPOLYMERS PREPARED BY CONTROLLED FREE RADICAL POLYMERIZATION PROCESSES

(71) Applicant: BASF SE, Ludwigshafen (DE)

(72) Inventors: Ralf Knischka, Lorrach (DE); Ernst Eckstein, Rheinfelden (DE); Clemens Auschra, Freiburg (DE); Akira Matsumoto, Hyogo (JP)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/660,260

(22) Filed: Oct. 25, 2012

(65) Prior Publication Data
US 2013/0059964 A1 Mar. 7, 2013

Related U.S. Application Data

(63) Continuation of application No. 13/112,280, filed on May 20, 2011, now abandoned, which is a continuation of application No. 11/794,707, filed as application No. PCT/EP2006/050000 on Jan. 2, 2006, now abandoned.

(30) Foreign Application Priority Data

Jan. 11, 2005 (EP) .................................. 05100102

(51) Int. Cl.
C08F 8/00 (2006.01)
C08F 20/10 (2006.01)
C08F 120/10 (2006.01)

(52) U.S. Cl.
USPC ............... 525/330.6; 525/330.3; 525/342; 525/383; 525/384; 525/479; 526/217; 526/220; 526/319; 526/326; 526/75; 526/204

(58) Field of Classification Search
USPC ........... 525/330.3, 330.6, 342, 383, 384, 479; 526/217, 220, 319, 326, 75, 204
See application file for complete search history.

(56) References Cited

U.S. PATENT DOCUMENTS

| 4,393,043 | A  | * | 7/1983  | Koulbanis et al. ............. 424/59 |
|-----------|----|---|---------|--------------------------------------|
| 4,581,429 | A  | * | 4/1986  | Solomon et al. ............... 526/220 |
| 4,972,037 | A  |   | 11/1990 | Garbe et al. .................. 526/245 |
| 5,133,898 | A  | * | 7/1992  | Fock et al. ...................... 516/30 |
| 5,744,523 | A  | * | 4/1998  | Barkowsky et al. .......... 523/523 |
| 6,353,107 | B1 | * | 3/2002  | Kramer et al. ................ 546/216 |
| 2003/0105201 | A1 |  | 6/2003  | Auschra et al. ............... 524/415 |
| 2004/0024130 | A1 |  | 2/2004  | Nelson et al. ................. 525/242 |
| 2004/0143035 | A1 |  | 7/2004  | Goebelt et al. ................ 523/200 |
| 2005/0004310 | A1 |  | 1/2005  | Hong et al. ................... 525/178 |
| 2005/0023398 | A1 |  | 2/2005  | Hiraguchi ..................... 242/348 |

FOREIGN PATENT DOCUMENTS

| DE | 100 52 646    |   | 5/2002 |
|----|---------------|---|--------|
| WO | WO 00/40630   | * | 7/2000 |
| WO | 2004/058881   |   | 7/2004 |

* cited by examiner

*Primary Examiner* — Robert C Boyle
(74) *Attorney, Agent, or Firm* — Tyler A. Stevenson

(57) ABSTRACT

The instant invention pertains to the preparation of polymers or copolymers wherein in a first step a controlled free radical polymerization process is carried out and in a second step the resulting polymer is modified by transesterification reactions. The final modified polymer or copolymer is useful as a dispersant for pigments. Further aspects of the invention are the thus prepared polymers or copolymers, a pigment concentrate containing the polymer or copolymer and a coating material containing the pigment concentrate.

21 Claims, No Drawings

PROCESS FOR THE POST-MODIFICATION OF HOMO AND COPOLYMERS PREPARED BY CONTROLLED FREE RADICAL POLYMERIZATION PROCESSES

This application is a continuation of U.S. application Ser. No. 13/112,280, filed May 20, 2011, abandoned, which is a continuation of U.S. application Ser. No. 11/794,707, abandoned, which is a 371 of international app. No. PCT/EP 2006/050000, filed Jan. 2, 2006, the contents of which are incorporated by reference.

The instant invention pertains to the preparation of polymers or copolymers wherein in a first step a controlled free radical polymerization process is carried out and in a second step the resulting polymer is modified by specific polymer analogous reactions. The final modified polymer or copolymer is useful as a dispersant for pigments, as leveling agent or as rheology modifier for coatings or related applications. Further aspects of the invention are the thus prepared polymers or copolymers, a pigment concentrate containing the polymer or copolymer and a coating material containing the pigment concentrate.

Due to environmental pressure, the demand for waterborne coatings and solvent borne high solids coatings will continue to increase in the future in most of the coating segments. Polymeric pigment dispersants are an essential part of new water based or solvent based high solids formulation technology. There is, therefore, an increasing activity in developing new products in these coating areas. So far, only a few classes of polymeric dispersants have been established in the market. In less demanding coating applications, still a lot of low molecular weight surfactants are used. In more demanding applications, e.g. automotive & industrial coatings, polymeric pigment dispersants have to be used to avoid the problems associated with low molecular weight surfactants (water sensitivity, corrosion, foam).

The controlled free radical polymerisation (CFRP) is a tool to tailor the microstructure of polymers (e.g. blockcopolymers) in a way that is favorable for dispersing and stabilizing pigments in the mill-base. The combination of CFRP with subsequent post-modification of the stabilizing block allows enlarging the possible groups that can be used as pigment dispersants. With one CFRP-process a large row of different polymer materials for either waterborne or also solvent-borne high solids systems becomes available.

Although the concept of post-modification of classically prepared polymers is known and, for example, described in DE 4308773, it has not been used broadly, because polymer analogous reactions are in general much more difficult to control, compared to their low molecular weight analogous reactions. Due to the polymeric nature of the substrate, reactions are slower and tend to be incomplete, unless drastic reaction conditions are used such as high temperature or very reactive reagents. However, such measures usually lead to badly defined polymer structures caused by chain scission and cross coupling reactions, resulting in broadening of the molecular weight distribution, branching and gel formation. Another fundamental problem in polymer analogous reactions is, that usually the reaction does not proceed to completion and it is very difficult and costly, if not impossible, to purify the resulting modified polymer from non-converted reagents or unwanted side products.

Surprisingly it has been found, that the post-modification, particularly the transesterification, of polyacrylate polymers made by nitroxyl-mediated controlled free radical polymerization, is possible in significantly higher yields than with classical polymers, without sacrificing the advantages of a well-defined polymer structure, such as low polydispersity.

With the transesterification as post modification technique polymers or copolymers can be prepared in an easy manner, which otherwise would not be available or can be prepared only with complex reactions.

The inventive process comprises a selective polymer-analogous transesterification on polymers, which have been synthesized via nitroxide-mediated polymerization to provide well-defined polymer architectures. This process provides polymers with distinct structural differences compared to polymers with same monomer composition, but synthesized directly from corresponding monomers without post-transesterification.

The main differences are:

1) Monomer sequence: In direct radical polymerization of two different monomers the monomer sequence statistics along the polymer chain is governed by the copolymerization parameters which in most cases will cause deviation from ideal random distribution of the different monomers. Using the inventive process, the monomer distribution which result from the transesterification step, is only governed by the transesterification reaction and can be expected to provide a more uniform i.e. random distribution along the polymer chain.

2) Residual monomers: Controlled polymerization processes can not be conducted to 100% conversion without significant decrease in livingness of the polymer chains. In well-defined block copolymer synthesis, it is therefore necessary to remove the non-reacted monomers of the first block, before the second block is prolonged with a different monomer. Evaporation at reduced pressure is the easiest way to remove non-reacted monomers, but works only well for monomers with boiling point below 200° C. For example acrylates of long chain alcohols like C12-C15-alcohols or MPEG-alcohols can not be removed form polyacrylates by distillation. Therefore it is not possible to make block copolymers of such long chain acrylates with pure block structure free of residual monomers. The inventive process via transesterification circumvents the problem of residual non-removable monomers and associated problems of block contamination, is therefore capable to provide polymers with higher level of structural perfection.

3) Acrylates and methacrylates derived from unsaturated alcohols

Acrylate monomers based on unsaturated alcohols like allyl alcohol or oleyl alcohol usually react as crosslinkers. In conventional radical polymerization as well as in controlled polymerization such acrylates will lead to branching and/or crosslinking, i.e. will prevent the formation of structurally clean linear polymer chains. The inventive process of transesterification allows to introduce unsaturated alcohols to preformed controlled polymers with clean linear chain structure, i.e. provides access to well-defined structures e.g. block copolymers otherwise not accessible by direct radical polymerization.

One aspect of the invention is a process for the preparation of a modified polymer or copolymer comprising the steps a1) polymerizing in a first step one or more ethylenically unsaturated monomers in the presence of at least one nitroxylether having the structural element

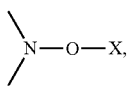

wherein X represents a group having at least one carbon atom and is such that the free radical X. derived from X is capable of initiating polymerization; or a2) polymerizing in a first step one or more ethylenically unsaturated monomers in the presence of at least one stable free nitroxyl radical

and a free radical initiator; wherein at least one monomer used in the steps a1) or a2) is a $C_1$-$C_6$ alkyl or hydroxy $C_1$-$C_6$ alkyl ester of acrylic or methacrylic acid; and a second step b) comprising the modification of the polymer or copolymer prepared under a1) or a2) by a transesterification reaction, an amidation, hydrolysis or anhydride modification or a combination thereof.

Preferably the first polymerization step is carried out according to the polymerization reactions a1) (claim 2).

Preferably the second step b) is a transesterification reaction, hydrolysis or an anhydride modification. Particularly preferred is a transesterification reaction (claim 3). The transesterification preferably comprises the removal of the $C_1$-$C_6$ alcohol byproduct by distillation.

In a specific embodiment step a1 or a2 of the above described process is carried out twice and a block copolymer is obtained wherein in the first or second radical polymerization step the monomer or monomer mixture contains 50 to 100% by weight, based on total monomers, of a $C_1$-$C_6$ alkyl or hydroxyalkyl ester of acrylic or methacrylic acid and in the second or first radical polymerization step respectively, the ethylenically unsaturated monomer contains no primary or secondary ester bond (claim 4).

When a block copolymer is prepared it is preferred that in the first polymerization step the monomer or monomer mixture contains from 50 to 100% by weight based on total monomers of a $C_1$-$C_6$ alkyl or hydroxyalkyl ester of acrylic or methacrylic acid and in the second polymerization step the ethylenically unsaturated monomer is 4-vinyl-pyridine or pyridinium-ion, 2-vinyl-pyridine or pyridinium-ion, vinyl-imidazole or imidazolinium-ion, dimethylacrylamide, 3-dimethylaminopropylmethacrylamide, styrene, α-methyl styrene, p-methyl styrene or p-tert-butyl-styrene (claim 5).

In a specific embodiment of the invention the block copolymer is a gradient block copolymer (claim 6).

As mentioned above it is mandatory that the polymer or copolymer is prepared by controlled free radical polymerization (CFRP). Solomon et al. in U.S. Pat. No. 4,581,429 have firstly described such processes using stable free nitroxyl radicals as controlling agents. These are the steps defined under a1) and a2) above.

U.S. Pat. No. 4,581,429 discloses a free radical polymerization process by controlled or "living" growth of polymer chains, which produces defined oligomeric homopolymers and copolymers, including block and graft copolymers. Disclosed is the use of initiators of the partial formula R'R"N—O—X. In the polymerization process the free radical species R'R"N—O. and .X are generated. .X is a free radical group, e.g. a tert.-butyl or cyanisopropyl radical, capable of polymerizing monomer units containing ethylene groups.

A variation of the above process is disclosed in U.S. Pat. No. 5,322,912 (Xerox) wherein the combined use of a free radical initiator and a stable free radical agent of the basic structure R'R"N—O. for the synthesis of homopolymers and block copolymers is described.

These processes are useful for the preparation of homo-, random-, block-, tapered-, graft- or comb (co)polymers, which have a narrow molecular weight distribution and hence a low polydispersity index.

For example the structural element

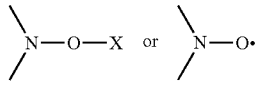

may be part of a cyclic ring system or substituted to form a acyclic structure.

Suitable nitroxylethers and nitroxyl radicals are principally known from U.S. Pat. No. 4,581,429 or EP-A-621 878.

Particularly useful are the open chain compounds described in WO 98/13392 (Akzo), WO 99/03894 (Ciba) and WO 00/07981 (Ciba), the piperidine derivatives described in WO 99/67298 (Ciba) and GB 2335190 (Ciba) or the heterocyclic compounds described in GB 2342649 (Ciba) and WO 96/24620 (Atochem).

Further suitable nitroxylethers and nitroxyl radicals are described in WO 02/4805 (Ciba) and in WO 02/100831 (Ciba).

Nitroxylethers and nitroxyl radicals with more than one nitroxyl group in the molecule are for example described in U.S. Pat. No. 6,573,347(Ciba), WO 01/02345 (Ciba) and WO 03/004471 (Ciba) These compounds are ideally suitable when branched, star or comb (co)polymers are prepared.

In the context of the present invention the terms alkoxyamine and nitroxylether are used as equivalents.

Stable free radicals having a structural element

are for example disclosed in EP-A-621 878 (Xerox).

Examples, such as

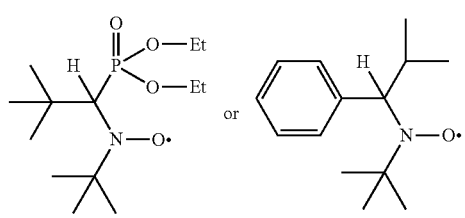

are given in WO96/24620 (Atochem).

Preferably the structural element

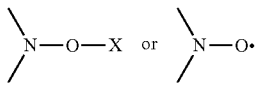

is part of a 5 or 6-membered heterocyclic ring, which optionally has an additional nitrogen or oxygen atom in the ring system. Substituted piperidine, morpholine and piperazine derivatives are particularly useful.

Preferably the structural element

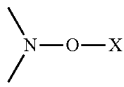

is a structural element of formula (I) and the structural element

is a structural element of formula (II)

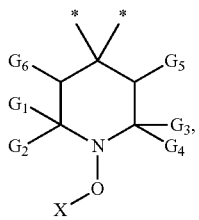
(I)

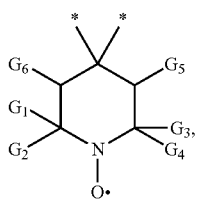
(II)

wherein
$G_1$, $G_2$, $G_3$, $G_4$ are independently $C_1$-$C_6$alkyl or $G_1$ and $G_2$ or $G_3$ and $G_4$, or $G_1$ and $G_2$ and $G_3$ and $G_4$ together form a $C_5$-$C_{12}$cycloalkyl group;
$G_5$, $G_6$ independently are H, $C_1$-$C_{18}$alkyl, phenyl, naphthyl or a group COO$C_1$-$C_{18}$alkyl;
X is selected from the group consisting of —CH$_2$-phenyl, CH$_3$CH-phenyl, (CH$_3$)$_2$C-phenyl, ($C_5$-$C_6$cycloalkyl)$_2$CCN,

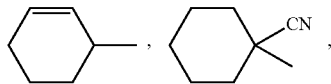

—CH$_2$CH=CH$_2$, CH$_3$CH—CH=CH$_2$($C_1$-$C_4$alkyl)CR$_{20}$—C(O)-phenyl, ($C_1$-$C_4$)alkyl-CR$_{20}$—C(O)—($C_1$-$C_4$)alkoxy, ($C_1$-$C_4$)alkyl-CR$_{20}$—C(O)—($C_1$-$C_4$)alkyl, ($C_1$-$C_4$)alkyl-CR$_{20}$—C(O)—N-di($C_1$-$C_4$)alkyl, ($C_1$-$C_4$)alkyl-CR$_{20}$—C(O)—NH($C_1$-$C_4$)alkyl, ($C_1$-$C_4$)alkyl-CR$_{20}$—C(O)—NH$_2$, wherein R$_{20}$ is hydrogen or ($C_1$-$C_4$)alkyl and * denotes a valence (claims 7, 8).

In particular the structural element of formula (I) is of formula A, B or O,

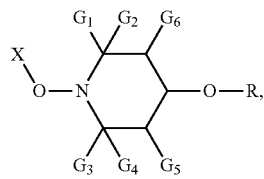
(A)

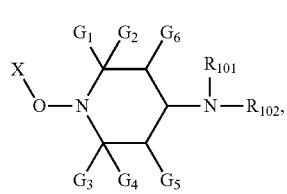
(B)

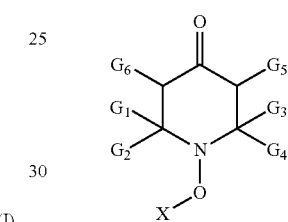
(O)

wherein
R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;
$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;
$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —CH$_2$CH(OH)—Z or of the formula —CO—Z or —CONH—Z wherein Z is hydrogen, methyl or phenyl;
$G_6$ is hydrogen and
$G_5$ is hydrogen or $C_1$-$C_4$alkyl,
$G_1$ and $G_3$ are methyl and $G_2$ and $G_4$ are ethyl or propyl or $G_1$ and $G_2$ are methyl and $G_3$ and $G_4$ are ethyl or propyl; and
X is selected from the group consisting of —CH$_2$-phenyl, CH$_3$CH-phenyl, (CH$_3$)$_2$C-phenyl, ($C_5$-$C_6$cycloalkyl)$_2$CCN, (CH$_3$)$_2$CCN,

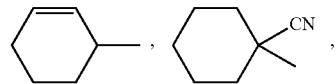

—CH$_2$CH=CH$_2$, CH$_3$CH—CH=CH$_2$ ($C_1$-$C_4$alkyl)CR$_{20}$—C(O)-phenyl, ($C_1$-$C_4$)alkyl-CR$_{20}$—C(O)—($C_1$-$C_4$)alkoxy, ($C_1$-$C_4$)alkyl-CR$_{20}$—C(O)—($C_1$-$C_4$)alkyl, ($C_1$-$C_4$)

alkyl-CR$_{20}$—C(O)—N-di(C$_1$-C$_4$)alkyl, (C$_1$-C$_4$)alkyl-CR$_{20}$—C(O)—NH(C$_1$-C$_4$)alkyl, (C$_1$-C$_4$)alkyl-CR$_{20}$—C(O)—NH$_2$, wherein R$_{20}$ is hydrogen or (C$_1$-C$_4$)alkyl.

The above compounds and their preparation are described in GB2335190 and GB2361235.

Another preferred group of nitroxylethers are those of formula (Ic), (Id), (Ie), (If), (Ig) or (Ih)

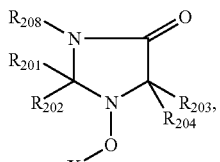
(Ic)

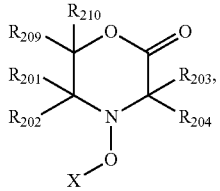
(Id)

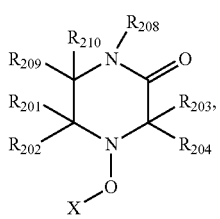
(Ie)

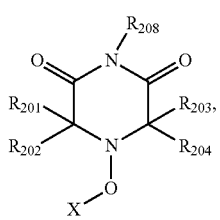
(If)

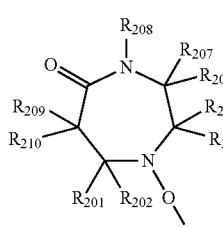
(Ig)

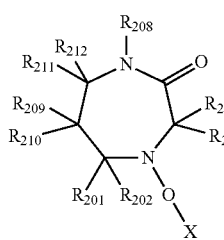
(Ih)

wherein R$_{201}$, R$_{202}$, R$_{203}$ and R$_{204}$ independently of each other are C$_1$-C$_{18}$alkyl, C$_3$-C$_{18}$alkenyl, C$_3$-C$_{18}$alkinyl, C$_1$-C$_{18}$alkyl, C$_3$-C$_{18}$alkenyl, C$_3$-C$_{18}$alkinyl which are substituted by OH, halogen or a group —O—C(O)—R$_{205}$, C$_2$-C$_{18}$alkyl which is interrupted by at least one O atom and/or NR$_{205}$ group, C$_3$-C$_{12}$cycloalkyl or C$_6$-C$_{10}$aryl or R$_{201}$ and R$_{202}$ and/or R$_{203}$ and R$_{204}$ together with the linking carbon atom form a C$_3$-C$_{12}$cycloalkyl radical;

R$_{205}$, R$_{206}$ and R$_{207}$ independently are hydrogen, C$_1$-C$_{18}$alkyl or C$_6$-C$_{10}$aryl;

R$_{208}$ is hydrogen, OH, C$_1$-C$_{18}$alkyl, C$_3$-C$_{18}$alkenyl, C$_3$-C$_{18}$alkinyl, C$_1$-C$_{18}$alkyl, C$_3$-C$_{18}$alkenyl, C$_3$-C$_{18}$alkinyl which are substituted by one or more OH, halogen or a group —O—C(O)—R$_{205}$, C$_2$-C$_{18}$alkyl which is interrupted by at least one O atom and/or NR$_{205}$ group, C$_3$-C$_{18}$cycloalkyl or C$_6$-C$_{10}$aryl, C$_7$-C$_9$-phenylalkyl, C$_5$-C$_{10}$heteroaryl, —C(O)—C$_1$-C$_{18}$alkyl, —O—C$_1$-C$_{18}$alkyl or —COOC$_1$-C$_{18}$alkyl;

R$_{209}$, R$_{210}$, R$_{211}$ and R$_{212}$ are independently hydrogen, phenyl or C$_1$-C$_{18}$alkyl; and X is selected from the group consisting of —CH$_2$-phenyl, CH$_3$CH-phenyl, (CH$_3$)$_2$C-phenyl, (C$_5$-C$_6$cycloalkyl)$_2$CCN, (CH$_3$)$_2$CCN,

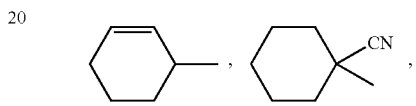

—CH$_2$CH═CH$_2$, CH$_3$CH—CH═CH$_2$ (C$_1$-C$_4$alkyl)CR$_{20}$—C(O)-phenyl, (C$_1$-C$_4$)alkyl-CR$_{20}$—C(O)—(C$_1$-C$_4$)alkoxy, (C$_1$-C$_4$)alkyl-CR$_{20}$—C(O)—(C$_1$-C$_4$)alkyl, (C$_1$-C$_4$)alkyl-CR$_{20}$—C(O)—N-di(C$_1$-C$_4$)alkyl, (C$_1$-C$_4$)alkyl-CR$_{20}$—C(O)—NH(C$_1$-C$_4$)alkyl, (C$_1$-C$_4$)alkyl-CR$_{20}$—C(O)—NH$_2$, wherein R$_{20}$ is hydrogen or (C$_1$-C$_4$)alkyl.

More preferably in formula (Ic), (Id), (Ie), (If), (Ig) and (Ih) at least two of R$_{201}$, R$_{202}$, R$_{203}$ and R$_{204}$ are ethyl, propyl or butyl and the remaining are methyl; or R$_{201}$ and R$_{202}$ or R$_{203}$ and R$_{204}$ together with the linking carbon atom form a C$_5$-C$_6$cycloalkyl radical and one of the remaining substituents is ethyl, propyl or butyl.

Most preferably X is CH$_3$CH-phenyl.

The above compounds and their preparation are described in GB 2342649.

Further suitable compounds are the 4-imino compounds of formula (III) or (III')

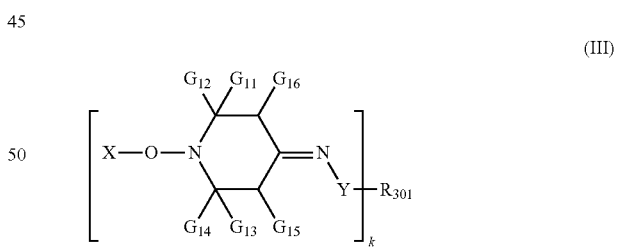
(III)

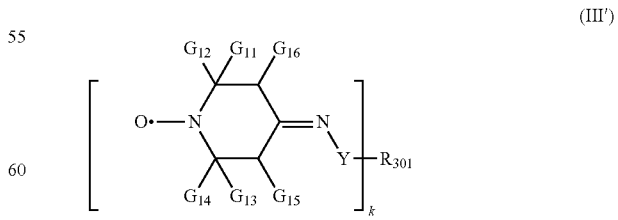
(III')

wherein
G$_{11}$, G$_{12}$, G$_{13}$ and G$_{14}$ are independently C$_1$-C$_4$alkyl or G$_{11}$ and G$_{12}$ together and G$_{13}$ and G$_{14}$ together, or G$_{11}$ and G$_{12}$ together or G$_{13}$ and G$_{14}$ together are pentamethylene;

$G_{15}$ and $G_{16}$ are each independently of the other hydrogen or $C_1$-$C_4$alkyl;

X is as defined above;

k is 1, 2, 3, or 4

Y is O or $NR_{302}$ or when k is 1 and $R_{301}$ represents alkyl or aryl Y is additionally a direct bond;

$R_{302}$ is H, $C_1$-$C_{18}$alkyl or phenyl;

if k is 1

$R_{301}$ is H, straight or branched $C_1$-$C_{18}$alkyl, $C_3$-$C_{18}$alkenyl or $C_3$-$C_{18}$alkinyl, which may be unsubstituted or substituted, by one or more OH, $C_1$-$C_8$alkoxy, carboxy, $C_1$-$C_8$alkoxycarbonyl; $C_5$-$C_{12}$cycloalkyl or $C_5$-$C_{12}$cycloalkenyl;

phenyl, $C_7$-$C_9$-phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl;

—C(O)—$C_1$-$C_{36}$alkyl, or an acyl moiety of α,β-unsaturated carboxylic acid having 3 to 5 carbon atoms or of an aromatic carboxylic acid having 7 to 15 carbon atoms;

—$SO_3^-Q^+$, —$PO(O^-Q^+)_2$, —$P(O)(OC_1$-$C_8alkyl_2)_2$, —$P(O)(OH_2)_2$, —$SO_2$—OH, —$SO_2$—$C_1$-$C_8$alkyl, —CO—NH—$C_1$-$C_8$alkyl, —$CONH_2$, COO—$C_1$-$C_8alkyl_2$, COOH or $Si(Me)_3$, wherein $Q^+$ is $H^+$, ammonium or an alkali metal cation;

if k is 2

$R_{301}$ is $C_1$-$C_{18}$alkylene, $C_3$-$C_{18}$alkenylene or $C_3$-$C_{18}$alkenylene, which may be unsubstituted or substituted, by one or more OH, $C_1$-$C_8$alkoxy, carboxy, $C_1$-$C_8$alkoxycarbonyl; or xylylene; or $R_{301}$ is a bisacyl radical of an aliphatic dicarboxylic acid having 2 to 36 carbon atoms, or a cycloaliphatic or aromatic dicarboxylic acid having 8-14 carbon atoms;

if k is 3, $R_{301}$ is a trivalent radical of an aliphatic, cycloaliphatic or aromatic tricarboxylic acid; and if k is 4, $R_{301}$ is a tetravalent radical of an aliphatic, cycloaliphatic or aromatic tetracarboxylic acid.

Preferably $G_{16}$ is hydrogen and $G_{15}$ is hydrogen or $C_1$-$C_4$alkyl, in particular methyl, and $G_{11}$ and $G_{13}$ are methyl and $G_{12}$ and $G_{14}$ are ethyl or propyl or $G_{11}$ and $G_{12}$ are methyl and $G_{13}$ and $G_{14}$ are ethyl or propyl.

The 4 imino compounds of formula III can be prepared for example according to E. G. Rozantsev, A. V. Chudinov, V. D. Sholle.: Izv. Akad. Nauk. SSSR, Ser. Khim. (9), 2114 (1980), starting from the corresponding 4-oxonitroxide in a condensation reaction with hydroxylamine and subsequent reaction of the OH group. The compounds are described WO 02/100831 (Ciba)

In particular the structural element of formula (II) is of formula A', B' or O', (A')

(B')

(O')

wherein

R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$—Z or of the formula —CO—Z or —CONH—Z wherein Z is hydrogen, methyl or phenyl;

$G_6$ is hydrogen and $G_5$ is hydrogen or $C_1$-$C_4$alkyl, $G_1$ and $G_3$ are methyl and $G_2$ and $G_4$ are ethyl or propyl or $G_1$ and $G_2$ are methyl and $G_3$ and $G_4$ are ethyl or propyl.

The alkyl radicals in the various substituents may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Alkenyl with 3 to 18 carbon atoms is a linear or branched radical as for example propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl.

Preferred is alkenyl with 3 to 12, particularly preferred with 3 to 6 carbon atoms.

Alkinyl with 3 to 18 is a linear or branched radical as for example propinyl (—$CH_2$—C≡CH), 2-butinyl, 3-butinyl, n-2-octinyl, or n-2-octadecanyl. Preferred is alkinyl with 3 to 12, particularly preferred with 3 to 6 carbon atoms.

Examples for hydroxy substituted alkyl are hydroxy propyl, hydroxy butyl or hydroxy hexyl.

Examples for halogen substituted alkyl are dichloropropyl, monobromobutyl or trichlorohexyl.

$C_2$-$C_{18}$alkyl interrupted by at least one O atom is for example —$CH_2$—$CH_2$—O—$CH_2$—$CH_3$, —$CH_2$—$CH_2$—O—$CH_3$— or —$CH_2$—$CH_2$—O—$CH_2$—$CH_2$—$CH_2$—O—

$CH_2$—$CH_3$—. It is preferably derived from polyethlene glycol. A general description is —$((CH_2)_a$—$O)_b$—$H/CH_3$, wherein a is a number from 1 to 6 and b is a number from 2 to 10.

$C_2$-$C_{18}$alkyl interrupted by at least one $NR_{205}$ group may be generally described as —$((CH_2)_a$—$NR_{205})_b$—$H/CH_3$, wherein a, b and $R_{205}$ are as defined above.

$C_3$-$C_{12}$cycloalkyl is typically, cyclopropyl, cyclopentyl, methylcyclopentyl, dimethylcyclopentyl, cyclohexyl, methylcyclohexyl or trimethylcyclohexyl.

$C_6$-$C_{10}$ aryl is for example phenyl or naphthyl, but also comprised are $C_1$-$C_4$alkyl substituted phenyl, $C_1$-$C_4$alkoxy substituted phenyl, hydroxy, halogen or nitro substituted phenyl. Examples for alkyl substituted phenyl are ethylbenzene, toluene, xylene and its isomers, mesitylene or isopropylbenzene. Halogen substituted phenyl is for example dichlorobenzene or bromotoluene.

Alkoxy substituents are typically methoxy, ethoxy, propoxy or butoxy and their corresponding isomers.

$C_7$-$C_9$-phenylalkyl is benzyl, phenylethyl or phenylpropyl.

$C_5$-$C_{10}$heteroaryl is for example pyrrol, pyrazol, imidazol, 2, 4, dimethylpyrrol, 1-methylpyrrol, thiophene, furane, furfural, indol, cumarone, oxazol, thiazol, isoxazol, isothiazol, triazol, pyridine, α-picoline, pyridazine, pyrazine or pyrimidine.

If R is a monovalent radical of a carboxylic acid, it is, for example, an acetyl, propionyl, butyryl, valeroyl, caproyl, stearoyl, lauroyl, acryloyl, methacryloyl, benzoyl, cinnamoyl or β-(3,5-di-tert-butyl-4-hydroxyphenyl)propionyl radical.

$C_1$-$C_{18}$alkanoyl is for example, formyl, propionyl, butyryl, octanoyl, dodecanoyl but preferably acetyl and $C_3$-$C_5$alkenoyl is in particular acryloyl.

In particular polymerization process a1) is very suitable. When process a1) is used the nitroxylether according to the structures outlined above splits between the O—X bond. The regulating fragment in formula (I) corresponds to the O—N fragment and the initiating fragment (In) corresponds to the C centered radical of the group X.

Particularly suitable nitroxylethers and nitroxyl radicals are those of formulae

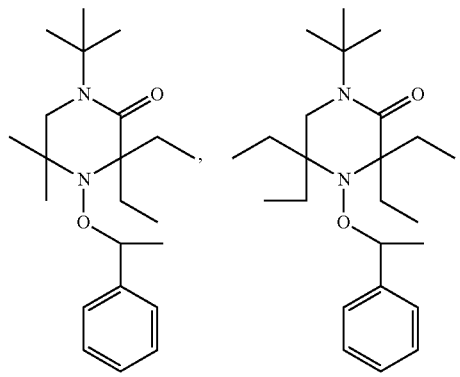

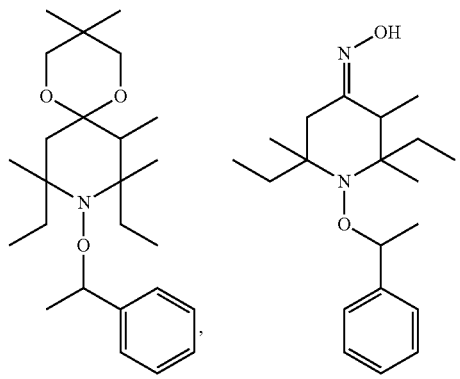

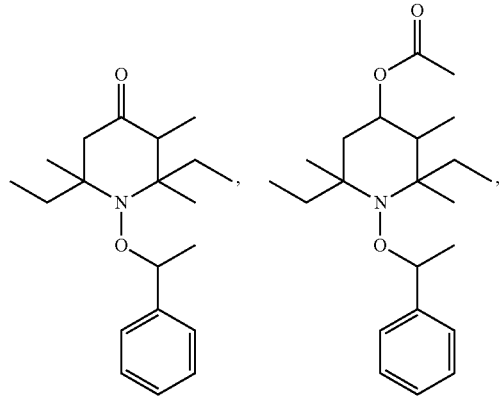

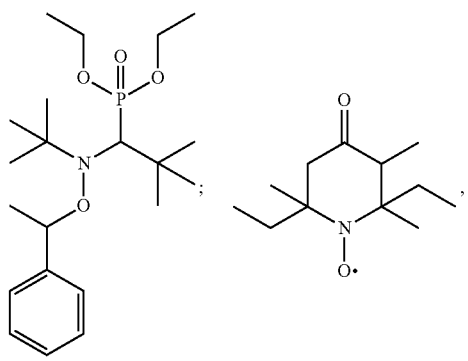

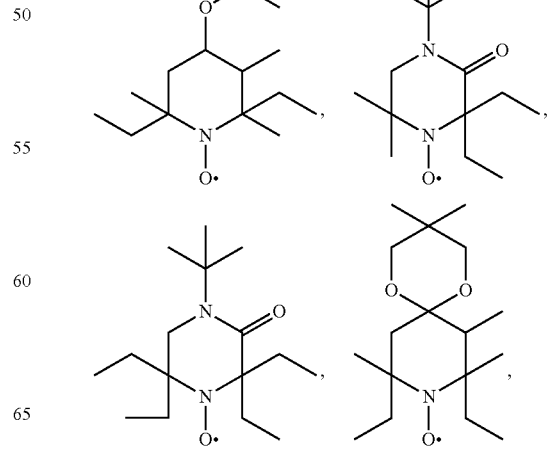

-continued

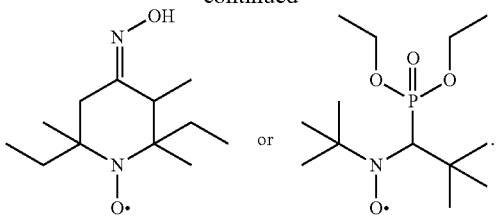

In a very specific embodiment of the invention, the polymer or copolymer is prepared with a compound of formula (O1)

(O1)

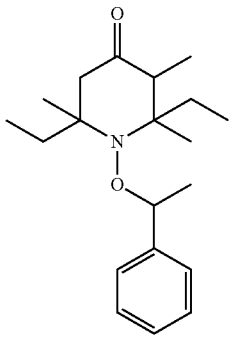

(claim 9)

Preferably the initiator compound is present in an amount of from 0.01 mol-% to 30 mol-%, more preferably in an amount of from 0.1 mol-% to 20 mol-% and most preferred in an amount of from 0.1 mol-% to 10 mol-% based on the monomer or monomer mixture.

When monomer mixtures are used mol % is calculated on the average molecular weight of the mixture.

When the process according to route a2) is chosen, the free radical initiator is preferably an azo compound, a peroxide, perester or a hydroperoxide.

Specific preferred radical sources are 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide)dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxy-methyl)ethyl]propionamide} or 2,2'-azobis{2-methyl-N-[1,1-bis(hydroxymethyl)-2-hydroxyethyl]propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis(t-butylperoxy)butane, 2,2 bis(t-butylperoxy) propane, dicumyl peroxide, 2,5-dimethylhexane-2,5-di-t-butylperoxide, 3-t-butylperoxy 3-phenylphthalide, di-t-amyl peroxide, α, α'-bis(t-butylperoxy isopropyl)benzene, 3,5-bis(t-butylperoxy)3,5-dimethyl 1,2-dioxolane, di-t-butyl peroxide, 2,5-dimethylhexyne-2,5-di-t-butyl-peroxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

The radical source is preferably present in an amount of from 0.01 mol-% to 30 mol-%, more preferred in an amount of from 0.1 mol-% to 20 mol-% and most preferred in an amount of from 0.5 mol-% to 10 mol-% based on the monomer or monomer mixture.

The molar ratio of the radical source to the nitroxyl radical may be from 1:10 to 10:1, preferably from 1:5 to 5:1 and more preferably from 1:2 to 2:1.

The polymer or copolymer can also be prepared in a controlled way by atom transfer radical polymerization (ATRP). This type of polymerization is, for example, described in WO 96/30421.

Reversible addition fragmentation chain transfer polymerization (RAFT) is also a well known controlled free radical polymerization technique and for example described in WO 98/01478, WO98/58974, WO 99/31144, WO 99/05099, WO 02/094887, WO 02/26836, WO 01/42312, WO 00/75207, and WO 99/35177.

The polymer or copolymer prepared according to steps a1) or a2) has preferably a polydispersity index of 1.0 to 2.2, more preferably from 1.1 to 1.9 and most preferably from 1.1 to 1.5.

As already mentioned above the second reaction step, i.e. the polymer analogous reaction, is a transesterification reaction, an amidation, hydrolysis or anhydride modification or a combination thereof.

Hydrolysis means the cleavage of an ester bond under alkaline or acidic conditions and can be carried out when the polymer or copolymer contains ester functionalities. The degree of hydrolysis may vary in a wide range and depends on reaction time and conditions. For example 5 to 100%, preferably 10% to 70% of the ester functionalities may be hydrolyzed, to form the free acid group, from which also a salt can be prepared. The metal ion is preferably an alkali metal ion, such as $Li^+$, $Na^+$ or $Ka^+$ or an ammonium cation, such as $NH_4^+$ or $NR_{404}$, wherein $R_{404}$ is hydrogen or $C_1$-$C_{18}$alkyl.

Anhydride modification can be carried out when the polymer or copolymer contains hydroxyl functionalities. The hydroxyl functionalities come for example from hydroxyl functional monomers, such as hydroxyethyl acrylate or methacrylate. Virtually all aliphatic or aromatic anhydrides can be used in the modification process. Examples for anhydrides are maleic acid anhydride, pyromelitic acid anhydride, cyclohexyldiacid anhydride, succinic acid anhydride, camphoric acid anhydride.

Transesterification means to replace the alcohol radical in an ester group of the polymer or copolymer by another alcohol radical. Preferably the alcohol radical to be replaced is methanol, ethanol, propanol or butanol. Typically the transesterification reaction is carried out at elevated temperatures, typically 70-200° C., by reacting the CFRP polymer with the corresponding alcohol using well-known catalysts, such as tetra-isopropyltitanate, tetra-butyltitanate, alkali- or earth alkali alcoholates like NaOMe or LiOMe. Typically the low boiling product alcohol is removed from the transesterification reaction mixture by distillation. If needed, catalyst residues may be removed by adsorption or extraction or otherwise processed or inactivated by known methods, like hydrolysis with water or acids.

The Choice of the Replacing Alcohol is Important. The Replacing Alcohol Controls the Properties of the Resulting Copolymer.

Using a polar replacing alcohol such as alcohols having e.g. the following formula R—[O—CH$_2$—CH$_2$—]$_n$—OH, e.g. MPEG-OH, it is possible to obtain a water soluble resulting polymer. Of course the solubility depends on the amount of transesterified monomer units. At least 40% of the units should be transesterified to obtain the desired effect.

If solubility in organic solvents is required non polar alcohols like higher molecular weight branched aliphatic alcohols can be beneficial.

If polymers with low surface tension are desired, alcohols containing siloxane groups are preferred, e.g. with the following formula

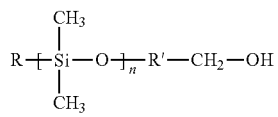

or partly or fully fluorinated primary alcohols can be used instead or in addition.

If a solid copolymer is required, solid alcohols or polar alcohols which are able to raise the glass transition temperature (Tg) or impart side chain crystallinity should be used. An example is behenyl alcohol.

The replacing alcohol radical is typically an aliphatic C$_6$-C$_{36}$ alcohol or a precursor of an alcohol, having at least one —OH group. The alcohol may also be interrupted by 1 to 20 O or N atoms or substituted by halogen, perfluoroalkyl, NH$_2$, NH(C$_1$-C$_{18}$alkyl), N(C$_1$-C$_{18}$alkyl)$_2$, COO(C$_1$-C$_{18}$alkyl), CON(C$_1$-C$_{18}$alkyl)$_2$, CONH(C$_1$-C$_{18}$alkyl), CONH$_2$, COOH, COO$^-$, O(C$_1$-C$_{18}$alkyl) or with a Si, P or S containing group, for example alkylhydroxysilicones. The alcohol may also contain heterocyclic ring structures, such as 1-(2-hydroxyethyl)-2-pyrrolidinone, 1-(2-hydroxyethyl)-2-imidazolidinone, 2-(2-hydroxyethyl)pyridine, N-2-hydroxyethyl)phthalimide, 4-(2-hydroxyethyl)morpholine, 1-(2-hydroxyethyl)piperazine, N-hydroxymethylphthalimide, 3-hydroxymethylpyridine or (4-pyridyl)-1-propanol.

The alcohols, which are interrupted by O or N atoms are not limited to 36 C atoms. These can be oligomeric or polymeric alcohols also. Examples of alcohols interrupted by O atoms are methoxypolyethyleneglycols or all kinds of adducts of ethyleneoxide and/or propyleneoxide (EO/PO). Such EO/PO-adducts can be random or block type structures.

Preferably the alcohol is an unsubstituted linear or branched C$_8$-C$_{36}$alkyl mono alcohol or a mono alcohol derived from ethyleneoxide, propyleneoxide or mixtures thereof with up to 100 C atoms. (Claim 11).

It is also possible to use fatty acid alcohol ethoxylates, alkylphenolethoxylates, alkoxylates of all kinds of monofunctional alcohols or phenols or secondary amines.

Preferably the alkoxylate is an ethoxylate of a primary alcohol or alkylphenol of structure (A):

R—[O—CH$_2$—CH$_2$—]$_n$—OH       (A)

wherein R is saturated or unsaturated, linear or branched chain alkyl with 1-22 carbon atoms, or alkylaryl or dialkylaryl with up to 24 carbon atoms and n is 1 to 50. (Claim 12)

Referring to an other embodiment the alcohol is an unsubstituted linear or branched C$_8$-C$_{36}$alkyl mono alcohol. (Claim 13). An example is iso C12-C15 alcohol. Non-polar polymers or copolymers are obtained.

In another embodiment, the macroalcohol is a primary OH-functional silicone oligomer. Preferred are polydimethylsilicone oligomers of structure (B):

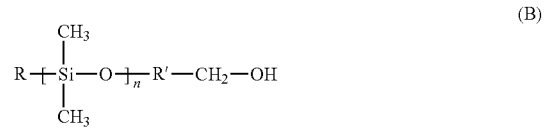

wherein R is C$_1$-C$_{18}$alkyl, phenyl or C$_7$-C$_{15}$aralkyl; n is 1 to 50 and R' is a linking group with 1 to 20 carbon atoms. (Claim 14).

Typical linking groups are C$_1$-C$_{18}$alkylene, phenylene or C$_1$-C$_{18}$alkylene interrupted by 1 to 6 oxygen atoms.

In another embodiment the alcohol is a partly or fully fluorinated primary alcohols. Examples of commercial fluorinated alcohol mixtures are: Zonyl BA®, Zonyl BA-L®, Zonyl BA-LD®, Zonyl BA-N® from Du Pont (claim 15).

Aryl is phenyl or naphthyl, preferably phenyl.

Precursors of alcohols are for example macroalcohols, such as poly-ε-caprolactone oligomers or ε-caprolactone adducts and similar lactone adducts (e.g. based on valerolactone) or mixed adducts of ε-caprolactone and valerolactone. Typical lactone adducts are adducts of ε-caprolactone to long chain fatty alcohols of structure:

R—[O—CO—CH$_2$—CH$_2$—CH$_2$—CH$_2$—CH$_2$—]$_n$—OH wherein R is saturated or unsaturated, linear or branched chain alkyl with 8-22 carbon atoms or alkylaryl or dialkylaryl with up to 24 carbon atoms and n is 1 to 50.

It is also possible to use macroalcohols based on polyolefins, which have typically molecular weights up to 5000, preferably up to 2000.

Yet another embodiment are unsaturated alcohols containing carbon-carbon double bonds or carbon triple bonds. An example is oleyl alcohol. Regarding triple bond preferred are primary alkynols like propargyl alcohol and higher homologues like alkylsubstituted propargylalcohol.

Preferably the alcohol is a primary or secondary alcohol. Most preferred are primary alcohols or alcohol mixtures.

Preferably the alcohol or alcohol mixture is non-volatile and has a boiling point or range of at least 100° C., more preferably of at least 200° C.

Preferably the alcohol is a monoalcohol.

Under the term amidation there is understood the modification of the ester function of a polyacrylate with an amine under the formation of an amide bond. Preferably the amine is a monofunctional primary or secondary amine, most preferably a primary aliphatic or aromatic amine. The reaction of the amine with the ester function of the CFRP polymer is typically conducted at elevated temperatures of 70-200° C., optionally in presence of catalysts. In a preferred process, the resulting alcohol is removed during the amidation reaction by distillation.

Preferably the amine has a high boiling point or boiling range of above 100° C.

Typical amines are primary aliphatic or aromatic amines with up to 36 carbon atoms, linear, branched or cyclic. The amine may contain heteroatoms O or N.

In a preferred embodiment there are oligomers and macroamines with a single primary amine and molecular weights of up to 5000. Typical examples are primary amine end-functional alkoxylates. Especially preferred are also primary amines containing other polar groups like ether, ester and amide groups.

In principal the monomer in step a1 or a2 can be selected from isoprene, 1,3-butadiene, $\alpha$-$C_5$-$C_{18}$alkene, 4-vinyl-pyridine or pyridinium-ion, 2-vinyl-pyridine or pyridinium-ion, vinylimidazole or imidazolinium-ion, dimethylacrylamide, 3-dimethylaminopropylmethacrylamide, styrene, $\alpha$-methyl styrene, p-methyl styrene, p-tert-butyl-styrene or a compound of formula $CH_2$=$C(R_a)$—$(C$=$Z)$—$R_b$, wherein $R_a$ is hydrogen or $C_1$-$C_4$alkyl, $R_b$ is $NH_2$, $O^-(Me^+)$, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, hydroxy-substituted $C_1$-$C_{18}$alkylamino or hydroxy-substituted di($C_1$-$C_{18}$alkyl)amino, —O—$CH_2$—$CH_2$—$N(CH_3)_2$ or —O—$CH_2$—$CH_2$—$N^+H(CH_3)_2An^-$;

$An^-$ is a anion of a monovalent organic or inorganic acid;
Me is a monovalent metal atom or the ammonium ion.
Z is oxygen or sulfur (claim 10).

Examples for $R_b$ as $C_2$-$C_{100}$alkoxy interrupted by at least one O atom are of formula

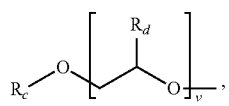

wherein $R_c$ is $C_1$-$C_{25}$alkyl, phenyl or phenyl substituted by $C_1$-$C_{18}$alkyl, $R_d$ is hydrogen or methyl and v is a number from 1 to 50. These monomers are for example derived from non ionic surfactants by acrylation of the corresponding alkoxylated alcohols or phenols. The repeating units may be derived from ethylene oxide, propylene oxide or mixtures of both.

Further examples of suitable acrylate or methacrylate monomers are given below.

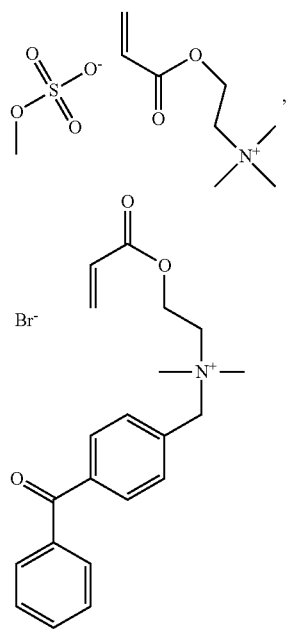

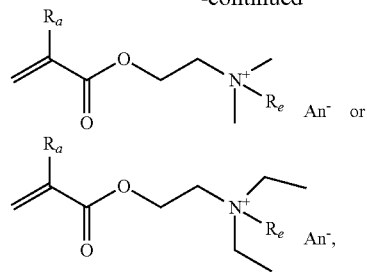

wherein $An^-$ and $R_a$ have the meaning as defined above and $R_e$ is methyl, benzyl or benzoylbenzyl. An is preferably $Cl^-$, $Br^-$ or $^-O_3S$—O—$CH_3$.

Further acrylate monomers are

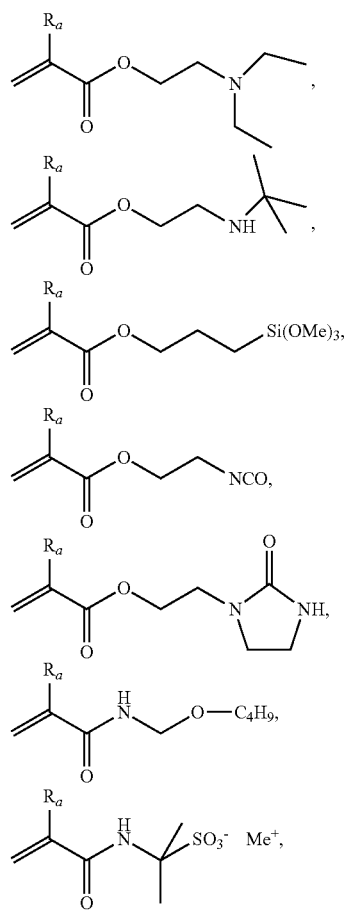

$Me^+$ is an alkali metal cation or the ammonium cation. Useful are also silicone functional (meth)acrylates.

Examples for suitable monomers other than acrylates are

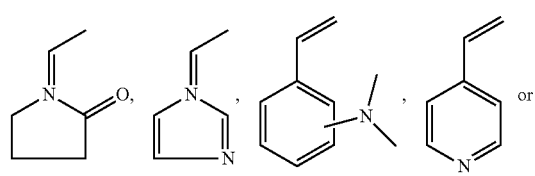

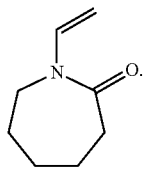

Preferably $R_a$ is hydrogen or methyl, $R_b$ is $NH_2$, glycidyl, unsubstituted or with hydroxy substituted $C_1$-$C_4$alkoxy, unsubstituted $C_1$-$C_4$alkylamino, di($C_1$-$C_4$alkyl)amino, hydroxy-substituted $C_1$-$C_4$alkylamino or hydroxy-substituted di($C_1$-$C_4$alkyl)amino; and Z is oxygen.

For example the ethylenically unsaturated monomer is selected from the group consisting of ethylene, propylene, n-butylene, i-butylene, styrene, substituted styrene, conjugated dienes, acrolein, vinyl acetate, vinylpyrrolidone, vinylimidazole, maleic anhydride, (alkyl)acrylic acid-anhydrides, (alkyl)acrylic acid salts, (alkyl)acrylic esters, (alkyl) acrylonitriles, (alkyl)acryl-amides, vinyl halides or vinylidene halides.

For instance the ethylenically unsaturated monomer is styrene, substituted styrene, methylacrylate, ethylacrylate, butylacrylate, isobutylacrylate, tert. butylacrylate, hydroxyethylacrylate, hydroxypropylacrylate, dimethylaminoethylacrylate, methyl(meth)acrylate, ethyl(meth)acrylate, butyl(meth)acrylate, hydroxyethyl(meth)acrylate, hydroxypropyl(meth)-acrylate, dimethylaminoethyl(meth)acrylate, acrylonitrile, methacrylonitrile, acrylamide, methacrylamide or dimethylaminopropyl-methacrylamide.

Very suitable monomers are for example styrene, $C_1$-$C_8$alkylesters of acrylic or methacrylic acid, such as n-butylacrylate or methacrylate, acrylonitrile or methacrylonitrile, in particular styrene, acrylonitrile and n-butylacrylate.

It is also possible to use mixtures of the afore mentioned monomers, in particular styrene/acrylonitrile, styrene/butylacrylate, styrene/methylmethacrylate and styrene/butyl methacrylate Preference is given to a polymerizable composition wherein the ethylenically unsaturated monomer is a compound of formula $CH_2=C(R_a)-(C=Z)-R_b$, wherein Z is O or S;
$R_a$ is hydrogen or $C_1$-$C_4$alkyl;
$R_b$ is $NH_2$, $O^-(Me^+)$, glycidyl, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, hydroxy-substituted $C_1$-$C_{18}$alkylamino or hydroxy-substituted di($C_1$-$C_{18}$alkyl)amino, —O—$CH_2$—$CH_2$—N($CH_3$)$_2$ or —O—$CH_2$—$CH_2$—$N^+H(CH_3)_2An^-$;
$An^-$ is a anion of a monovalent organic or inorganic acid;
Me is a monovalent metal atom or the ammonium ion.

All possible polymer chain structures are comprised: e.g. linear or branched. If the monomers are selected from chemically different monomers, all possible monomer sequence structures are comprised, e.g. random-, blocklike, multiblock-, tapered- or gradient arrangement of the different monomers.

Under gradient polymers or gradient arrangement there are understood block copolymers, which are prepared in such a way, that the intersection between the two blocks is not a sharp boundary, but represents a continuous transition from one type of monomer to another type of monomer, i.e. both monomers extending to both blocks. This type of polymers can be obtained when the polymerization process is carried out for example in one step using monomers of different copolymerization parameters or by a multistep procedure, in which the monomer composition is stepwise changed by addition of appropriate amounts of another type of monomer. Another preferred procedure for the synthesis of gradient polymers is by using continuous feed processes, in which for example the controlled polymerization is started with a first monomer and before complete conversion, a second monomer is continuously fed to the reaction mixture, thus realizing a continuous transition along the polymer chains.

When step a1 or a2 of the process is carried out twice and a block copolymer is obtained for example the monomer or monomer mixture of the first radical polymerization contains from 50 to 100% by weight based on total monomers of a $C_1$-$C_4$ alkyl or hydroxyalkyl ester of acrylic or methacrylic acid and the second radical polymerization contains a monomer or monomer mixture possessing no primary or secondary ester bond.

Suitable monomers for the second radical polymerization do not react in the postmodification reaction, such as vinyl aromatic monomers or vinyl-aza-heterocycles.

Examples are 4-vinyl-pyridine(pyridinium-ion), 2-vinyl-pyridine(pyridinium-ion), vinyl-imidazole(imidazolinium-ion), dimethylacrylamide, acrylonitrile, 3-dimethylamino-propylmethacrylamide, styrene or substituted styrenes.

Naturally the sequence of the first and second radical polymerization can also be reversed.

When a block copolymer is prepared it is preferred that in the first polymerization the monomer or monomer mixture contains from 50 to 100% by weight based on total monomers of a $C_1$-$C_6$ alkyl or hydroxyalkyl ester of acrylic or methacrylic acid and in the second polymerization the ethylenically unsaturated monomer is 4-vinyl-pyridine or pyridinium-ion, 2-vinyl-pyridine or pyridinium-ion, vinyl-imidazole or imidazolinium-ion, dimethylacrylamide, 3-dimethylaminopropylmethacrylamide, styrene, α-methyl styrene, p-methyl styrene or p-tert-butyl-styrene.

In another specific embodiment of the invention, the monomers of the controlled polymer prepared according to a first step a1) or a2) contain aminic or acid groups, is than modified in a second step by a transesterification reaction, an amidation, hydrolysis or anhydride modification and thereafter the aminic or acid groups of the modified controlled polymer are converted to salt structures by reaction with a salt forming component. Typical salt forming components for amino groups are for example organic or inorganic acids or alkylhalogenides, especially such salt forming components, which are based on organic cyclic acids or cyclic alkylhalogenides. Typical examples of such salt forming components are described in EP 1275689 (Ciba) and WO 03/046029 (Ciba)

Typical salt forming components for acid groups on the modified controlled polymer are inorganic bases, such as NaOH, KOH, NH4OH or volatile aminoalcohols, such as 2-di-methylaminoethanol or 2-amino-2-methylpropanol (AMP), which are frequently used in coatings.

It is also possible to choose the monomers in the polymerization steps and the post modification reaction in such a way, that a lower critical solution temperature (LCST) in water or water rich solvent mixtures is obtained for the final polymer or copolymer.

This means, that the polymer or copolymer shows a good solubility at low temperatures and a decreasing solubility at high temperatures. This effect is for example described by Hammouda, B.; Ho, D.; Kline, S in Macromolecules (2002), 35(22), 8578-8585).

Consequently in a further specific embodiment of the invention, the process is carried out such, that the resulting polymer shows a lower critical solution temperature in water or water rich solvent mixtures.

Especially preferred are modified polymers with an LCST temperature range at 20% polymer by weight based on the water or water mixture between 25° C. and 80° C.

As already outlined above waterborne coatings will continue to increase in most of the coating segments in the next years. Polymeric pigment dispersants are an essential part, particularly of new waterbased formulation technology. The controlled free radical polymerisation (CFRP) is a tool to tailor the microstructure of polymers (e.g. blockcopolymers) in a way that is favorable for the dispersion and stabilization of pigments in the millbase. The combination of CFRP with subsequent postmodification of the stabilizing block allows enlarging the possible groups that can be used in pigment dispersants.

Consequently the use of a polymer or copolymer prepared according to the above process as pigment dispersant or rheology modifier leveling agent is also an aspect of the invention. (Claim 17)

Another aspect of the invention is a polymer or copolymer obtainable in a process as described above. (Claim 16). As outlined on page 2 of the description the process according to claim 1 provides polymers with distinct structural differences compared to polymers with same monomer composition, but synthesized directly from corresponding monomers without post-transesterification.

The definitions and preferences given for the process apply also for the other aspects of the invention.

A further aspect of the invention is a pigment concentrate comprising
a) a pigment and
b) a polymer or copolymer prepared according to the process of claim 1. (Claim 18)

Pigments may be organic or inorganic and are, for example, from the 1-aminoanthraquinone, anthanthrone, anthrapyrimidine, azo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone or thioindigo series, including those, where applicable, in the form of metal complexes or lakes. Azos may be, for example, mono- or dis-azo pigments from any known sub-class, obtainable, for example, by coupling, condensation or lake formation.

By way of example, examples of organic pigments include Colour Index Pigment Yellow 3, 12, 13, 14, 17, 24, 34, 42, 53, 62, 74, 83, 93, 95, 108, 109, 110, 111, 119, 123, 128, 129, 139, 147, 150, 164, 168, 173, 174, 184, 188, 191, 191:1, 193, 199, Pigment Orange 5, 13, 16, 34, 40, 43, 48, 49, 51, 61, 64, 71, 73, Pigment Red 2, 4, 5, 23, 48:1, 48:2, 48:3, 48:4, 52:2, 53:1, 57, 57:1, 88, 89, 101, 104, 112, 122, 144, 146, 149, 166, 168, 177, 178, 179, 181, 184, 190, 192, 194, 202, 204, 206, 207, 209, 214, 216, 220, 221, 222, 224, 226, 254, 255, 262, 264, 270, 272, Pigment Brown 23, 24, 33, 42, 43, 44, Pigment Violet 19, 23, 29, 31, 37, 42, Pigment Blue 15, 15:1, 15:2, 15:3, 15:4, 15:6, 16, 28, 29, 60, 64, 66, Pigment Green 7, 17, 36, 37, 50, Pigment White 6, Pigment Black 7, 12, 27, 30, 31, 32, Vat Red 74, 3,6-di(3'-cyano-phenyl)-2,5-dihydro-pyrrolo [3,4-c]pyrrole-1,4-dione or 3-phenyl-6-(4'-tert-butyl-phenyl)-2,5-dihydro-pyrrolo[3,4-c]pyrrole-1,4-dione.

Preference is given to phthalocyanine pigments, azobenzimidazolone, disazo and polycyclic pigments and also to isoindolinones, perylenes carbon black and diketopyrrolopyrroles.

Special preference is given to the pigment being a quinacridone, dioxazine, perylene, diketopyrrolopyrrole or disazo condensation pigment. Quinacridones are preferably prepared by oxidation of dihydroquinacridones using hydrogen peroxide, as described, for example, in U.S. Pat. No. 5,840, 901 or WO-02/077104.

The pigments may be single chemical compounds or mixtures of a plurality of components, including solid solutions or mixed crystals containing a plurality of chemical compounds. Preference is given to uniformly crystalline pigments as they usually yield greater color saturation than physical mixtures and mixed phases. If duller shades are nevertheless desired in the final application, this may be achieved by toning down with colorants of different color in a manner known per se.

The pigment concentrate may contain additional solvents, in particular water.

Yet a further aspect of the invention is a composition comprising
a) a thermoplastic, a chemically or structurally crosslinked polymer and
b) a polymer or copolymer prepared according to the process of claim 1 or 4. (Claim 19)

For example component a) is a film forming binder material. (Claim 20)

Examples for film forming binder materials suitable for all kinds of coatings are given below.

Preferably the above composition contains in addition an organic or inorganic pigment or mixtures thereof. (Claim 21)

Examples for pigments have already been given.

Film forming physically drying binder resins are typically derived from α,β-unsaturated acids and derivatives thereof such as polyacrylates and polymethacrylates; polymethyl methacrylates, polyacrylamides and polyacrylonitriles. Examples are thermoplastic polyacrylates (TPA).

Another class is for example derived from natural polymers such as cellulose acetate or butyrate. Also suitable are physically drying alkyd resins or nitrocellulose lacquers.

Thermally cross linking film forming binder resins are for example those given below.

1. Crosslinked polymers derived from aldehydes on the one hand and phenols, ureas and melamines on the other hand, such as phenol/formaldehyde resins, urea/formaldehyde resins and melamine/formaldehyde resins.

2. Drying and non-drying alkyd resins.

3. Unsaturated polyester resins derived from copolyesters of saturated and unsaturated dicarboxylic acids with polyhydric alcohols and vinyl compounds as crosslinking agents, and also halogen-containing modifications thereof of low flammability.

4. Crosslinkable acrylic resins derived from substituted acrylates, for example epoxy acrylates, urethane acrylates or polyester acrylates. These resins are typically crosslinked with melamine resins or (poly)isocyanate resins and known as thermosetting acrylics.

5. Alkyd resins, polyester resins and acrylate resins crosslinked with melamine resins, urea resins, isocyanates, isocyanurates, polyisocyanates or epoxy resins.

6. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

The cross linking alkyd resins which can be used as film forming binder resins in the present invention are the conventional stoving lacquers which are used in particular for coating automobiles (automobile finishing lacquers), for example lacquers based on alkyd/melamine resins and alkyd/acrylic/melamine resins (see H. Wagner and H. F. Sarx, "Lackkunstharze" (1977), pages 99-123). Other crosslinking agents include glycouril resins, blocked isocyanates or epoxy resins.

The coating compositions may be applied on wood, metal or plastic substrates.

The instant coating compositions are particularly suitable both for metal finish coatings and solid shade finishes of automobiles, especially in the case of retouching finishes, as well as various coil coating applications. The coating compositions in accordance with the invention are preferably applied in the conventional manner by two methods, either by the single-coat method or by the two-coat method. In the latter method, a pigment-containing base coat is applied first and then a covering coat of clear lacquer over it.

When water-soluble, water miscible or water dispersible coatings are desired ammonium salts of acid groups present in the resin are formed. Powder coating composition can be prepared by reacting glycidyl methacrylate with selected alcohol components.

Powder coating is a known technology and is described, for example, in "Ullmann's Encyclopedia of Industrial Chemistry, Fifth, Completely Revised Edition, Volume A 18", pages 438 to 444 (1991). In the powder coating process, a powder is generally fluidized with supply of air, electrostatically charged and applied to an earthed, preferably metallic substrate. The substrate is subsequently heated, in the course of which the adhering powder melts, coalesces and forms a coherent film on the metal surface. Since powder coating requires no solvent, this technology is especially friendly to the environment.

By powder coatings there are meant thermoplastic or stovable, crosslinkable polymers which are applied in powder form to predominantly metallic substrates. The manner in which the powder is brought into contact with the workpiece to be coated characterizes the various application techniques, for example electrostatic powder spraying with corona or triboelectric pistols, electrostatic fluidized-bed sintering or by using magnetic brush technology.

Examples of organic film-forming binders for powder coatings are stoving systems based on, for example, epoxy resins, polyester-hydroxyalkylamines, polyester-glycolurils, epoxy-polyester resins, polyester-trig lycidyl isocyanurates, hydroxy-functional polyester-blocked polyisocyanates, hydroxy-functional polyester-uretidiones, acrylate resins with hardener or mixtures of such resins. Also of interest are film-forming binders having thermoplastic properties, for example polyethylene, polypropylene, polyamides, polyvinyl chlorides, polyvinylidene dichloride or polyvinylidene difluoride.

It is to be understood that the inventive compositions containing the modified controlled polymers as dispersants or rheology modifiers also comprise coating related applications outside paints, like for example printing inks, ink jet inks, liquid colorants for plastics, casting resins, gel coats, filled unsaturated polyester resins like SMC or BMC (sheet molding compounds, bulk molding compounds) or gel coats and also comprise compositions for electronic applications like pigment dispersions for color filters.

Examples for thermoplastic or structurally crosslinked polymers wherein the instant dispersants or rheology modifiers, for example, together with pigments are useful are given below.
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
a) radical polymerisation (normally under high pressure and at elevated temperature).
b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either $\pi$- or $\sigma$-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).
2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).
3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethyl-lene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.
4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyalkyl phthalate or polyalkyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxyethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimides, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

The following examples illustrate the invention.

Materials use and their abbreviations.

Monomers: butylacrylate (BA), hydroxyethylacrylate (HEA), hydroxypropylacrylate (HPA) 4-vinyl-pyridine (4-VP).

Modification agents: cyclohexylacid anhydride (CHAA), succinic acid anhydride (SAA), methoxy-poly-ethyleneglycole (MPEG 550-OH), HCl, NaOH.

Solvents: methoxypropylacetate (MPA), Xylene, methoxypropanol (MP), polystyrene (PS), tetrahydrofurane (THF), polyethyleneoxide (POE/PEG).

ATRP process: initiator is 2-bromoethylpropionate (MBP), the catalyst is CuBr/CuBr$_2$, the ligand is N,N,N',N",N"-pentamethyldiethyltriamine (PMDETA).

NOR Initiator/regulator is compound O1

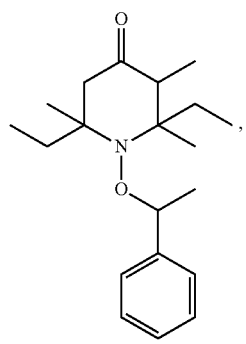
(O1)

which is prepared according to GB 2335190.

All other materials are commercially available and were used as received.

A) Preparation of Polymers and Copolymers

Example A1

Synthesis of a Linear Polymer Poly(BA)

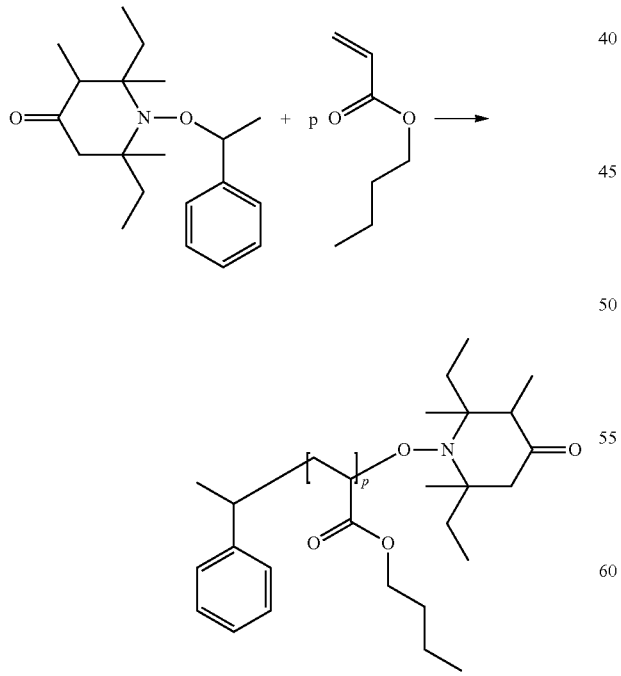

In a 3-necked 1000 ml round bottom flask with magnetic stirring bar, cooler, thermometer, dropping funnel 150.10 g n-Butylacrylate (n-BA, 128.17 g/mol), 8.55 g compound O1 (317.48 g/mol) and 122.13 g of MPA were added, three times degassed with N$_2$/vacuum and polymerized at 135° C. under N$_2$ until a conversion of around 8 mol % is reached. 338.89 g of n-BA is slowly added to the reaction with the dropping funnel and polymerized at 135° C. under N$_2$ until a conversion of around 48 mol %. Residual monomers and solvents were distilled of at 80° C. and 12 mbar.

Yield 47%, GPC (THF, PS-Standard, Mn=7800 g/mol, PD=1.27), liquid. According to analysis via $^1$H-NMR, the degree of polymerization is 75.

Example A2

Synthesis of a Linear Block Copolymer Poly(n-BA-b-4VP)

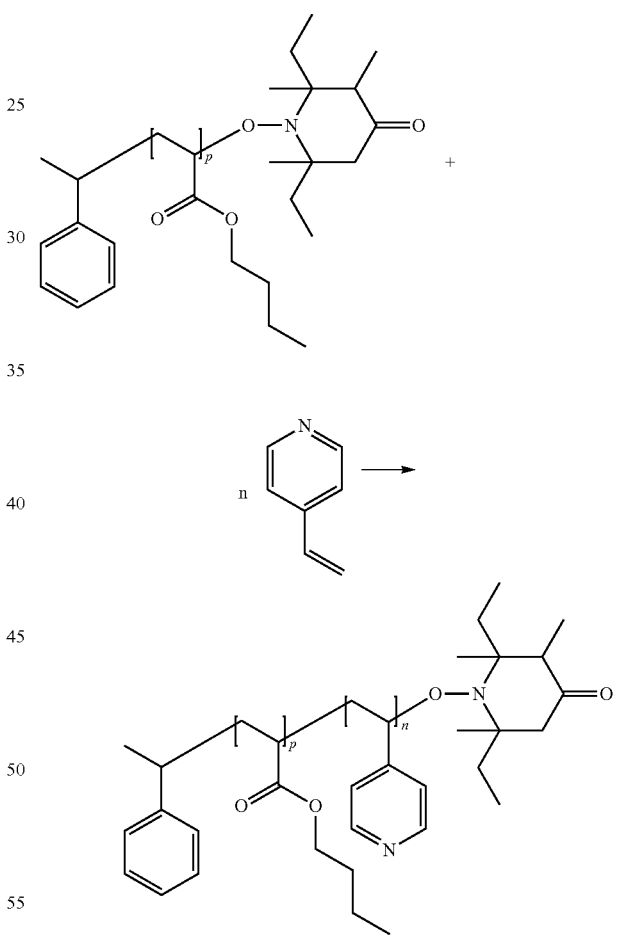

In a 3-necked 500 ml round bottom flask with magnetic stirring bar, cooler, thermometer 214.18 g poly(n-BA) of example A1, 70.90 g 4-vinylpyridine (4-VP, 105.14 g/mol) and 79.70 g of MPA are added, three times degassed with N$_2$/vacuum and polymerized at 125° C. under N$_2$ for 8 h. Residual monomers and solvents are distilled off at 80° C. and 12 mbar.

Yield 85%, GPC (THF, PS-Standard, Mn=8600 g/mol, PD=1.24), liquid.

According to analysis via ¹H-NMR, the degree of polymerization is: P(BA-b-4VP)=75-b-14.

Example A3

Poly(n-BA-MPEGA-b-4-VP)

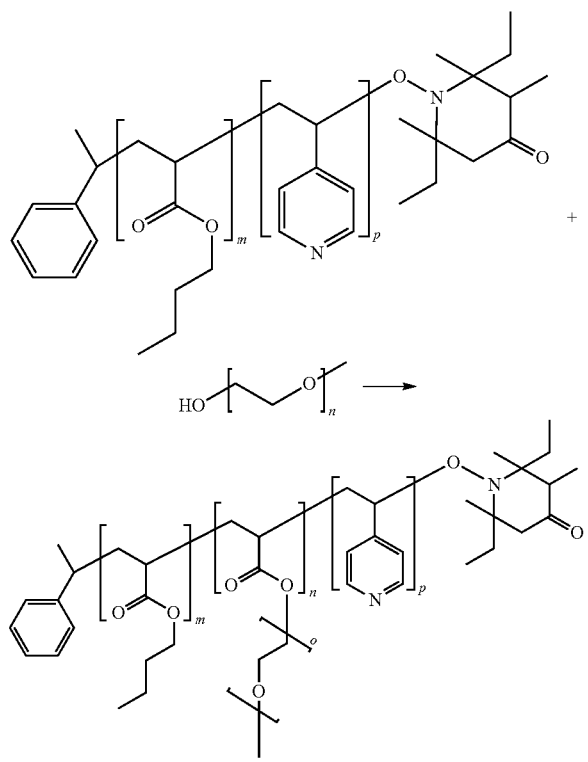

Transesterification using MPEG-OH

In a 500 mL flask equipped with a magnetic stirring bar, distillation column with dry ice acetone cooling 92.8 g of Poly(n-BA-b-4-VP) according to example A2 in 107.2 g of Xylene and 114.7 g of MPEG-OH (Mn=550 g/mol) are added and dried by azeotropic distillation of the xylene. Three portions of 0.36 g of tera(isopropyl)orthotitanate are added during 3 h at 190-205° C. The formed n-Butanol is distilled of at low pressure.

187.7 g of Poly(n-BA-MPEGA-b-4-VP) are obtained. Mn=17500 g/mol, PDI=1.6, OH-value=0.05 meq/g. Analysis via GPC as well as 1H_NMR indicate almost quantitative conversion of the MPEG-OH.

The resulting polymer is well soluble in water and shows an LCST-type solution behavior (LCST=lower critical solution temperature), i.e. the solubility of the polymer decreases with increasing temperature). A 35 wt % solution of the endproduct polymer in water is a clear solution at room temperature, but becomes turbid at elevated temperatures above 70° C. The resulting polymer also formed clear 10 wt % solutions in following organic solvents: butyl acetate, methoxypropylacetate, methoxypropanol, butylglycyl and xylene.

Example A4

Synthesis of a Linear Polymer Poly(BA)

In a 6 liter reactor equipped with stirrer, cooler, thermometer, and monomer feed pumps 1519 g n-Butylacrylate, 209 g compound O1 were added, three times degassed with N₂/vacuum and heated to 115° C. under N₂, where a continuous feed of n-butylacrylate was started over 4 hours and at the same time the reaction mass slowly heated to 135° C. After the end of the monomer feed, the reaction mass was further reacted for 5 h until a solids content of 55% was reached. Afterwards, the non reacted monomer was removed by vacuum distillation.

2812 g of Poly(n-BA) are obtained as liquid polymer, Mn=4554, PDI=1.18 According to analysis via ¹H-NMR, the degree of polymerization is: P(nBA)=35.

Example A5

Synthesis of a Linear Block Copolymer Poly(n-BA-b-4VP)

In the same reactor as in Ex. A4, 2674 g of polymer A4 were loaded together with 1133 g 4-vinylpyridine and heated under N₂ to 135° C. and reacted for 3.5 h until a solids content of 91% was reached. This polymer was used for subsequent transesterifications without further removal of non-reacted 4-vinylpyridine.

3732 g of Polymer P(nBA-b-4VP) were isolated from the reactor, Mn=4779, PDI=1.19 According to analysis via ¹H-NMR, the degree of polymerization is: P(nBA-b-4VP)=35-b-14.

Example A6

Synthesis of Block Copolymer Poly(n-BA-MPEGA-b-4-VP)

Transesterification using MPEG-OH

In the same reactor as in example A4, 3730 g of the polymer A5 were loaded together with 3503 g of MPEG-OH (M=550 g/mol) and subjected to vacuum degassing at 130° C. for one hour to remove non-reacted 4-vinylpyridine. 12.0 g of LiOMe-solution (10 wt % lithium methanolate in methanol were added slowly and the transesterification started by distilling off n-Butanol at 130° C. and reduced pressure. Additional 5 portions of catalyst were added after every hour: 2×12.0 g and additional 3×14.5 g of LiOMe-solution. After 6 h the reaction was completed by collecting the calculated amount of n-butanol.

6322 g of viscous polymer were obtained; Mn=8829, PDI=1.36
Analysis via GPC as well as 1H_NMR indicate almost quantitative conversion of the MPEG-OH.

According to analysis via ¹H-NMR, the degree of polymerization is: P[(nBA-MPEGA)-b-4VP]=(23-12)-b-14.
OH-number titration: 0.20 meq/g
Amine number titration: 69 mg KOH/g The 50 wt % solids solution in water displays an LCST of 67° C.

Aside from water, the polymer A6 gives clear solutions 10 wt % in following organic solvents: butyl acetate, methoxypropylacetate, methoxypropanol, butylglycyl and xylene.

For testing as pigment dispersant part of the polymer A6 was dissolved in water to give a clear 50 wt % solids solution, other parts of the polymer were dissolved in various other organic solvents.

Example A7

Synthesis of a Random Copolymer Poly(n-BA-MPEGA)

In the same reactor as in example A4 were loaded 500 g of a poly(n-BA) (Mn=8304, PDI=1.21), which was made analog polymer A4 and 500 g of MPEG-OH (M=550 g/mol). The mixture was heated to 128° C., than 21 g of LiOMe catalysts solution (10 wt % in methanol) were added slowly and n-butanol was slowly distilled off under reduced pressure. Catalyst addition was repeated 5 times each after one hour with 21 g catalyst solution. The transesterification was conducted in total for 6 h until the calculated amount of n-butanol had been distilled off.

918 g of polymer were obtained; Mn=13305, PDI=1.31

Analysis via GPC as well as 1H_NMR indicate almost quantitative conversion of the MPEG-OH.

According to analysis via $^1$H-NMR, the degree of polymerization is: P(nBA-MPEGA)=(58-19).

The 50 wt % solids solution in water displays an LCST of 70° C.

For testing as pigment dispersant part of the polymer A7 was dissolved in water to give a clear 50 wt % solids solution.

Example A8

Synthesis of a Random Copolymer Poly(n-BA-MPEGA) Comprising Different MPEG-OH: MPEG350, MPEG500, MPEG2000

In a 250 mL flask equipped with a magnetic stirring bar and distillation column are loaded 65 g of a P(nBA) (Mn=8386, PD=1.21; made analog to example A4), 7.5 g of MPEG-OH (M=350), 7.5 g MPEG-OH (M=500) and 20 g MPEG-OH (M=2000). The mixture was heated to 125° C. and 2 g of LiOMe catalyst solution (10 wt % in MeOH) were slowly added. The transesterification was started by slowly distilling off n-butanol under reduced pressure and increasing the temperature to 130° C. Two additional portions each of 2 g catalyst solution were added after 1 h and 2 h later. After 4 h total reaction time the transesterification was terminated after the calculated amount of n-butanol had been distilled off.
84 g of polymer were obtained; Mn=10490, PDI=1.61

Analysis via GPC as well as $^1$H-NMR indicate almost quantitative conversion of the MPEG-OH-mixture.

According to analysis via $^1$H-NMR, the degree of polymerization is: P(nBA-MPEGA-mix)=(69-7).

Example A9

Synthesis of a Random Copolymer Poly(n-BA-MPEGA) Comprising Different MPEG-OH: MPEG350, MPEG500, MPEG5000

In a 250 mL flask equipped with a magnetic stirring bar and distillation column are loaded 65 g of a P(nBA) (Mn=8386, PD=1.21; made analog to example A4), 7.5 g of MPEG-OH (M=350), 7.5 g MPEG-OH (M=500) and 20 g MPEG-OH (M=5000). The mixture was heated to 125° C. and 2 g of LiOMe catalyst solution (10 wt % in MeOH) were slowly added. The transesterification was started by slowly distilling off n-butanol under reduced pressure and increasing the temperature to 130° C. Two additional portions each of 2 g catalyst solution were added after 1 h and 2 h later. After 4 h total reaction time the transesterification was terminated after the calculated amount of n-butanol had been distilled off.
83 g of polymer were obtained; Mn=9563, PDI=1.75

Analysis via GPC as well as $^1$H-NMR indicate almost quantitative conversion of the MPEG-OH-mixture.

According to analysis via $^1$H-NMR, the degree of polymerization is: P(nBA-MPEGA-mix)=(71-6).

Example A10

Synthesis of a Random Copolymer Poly(n-BA-MPEGA-OleA) Comprising Unsaturated Groups In a 250 mL flask equipped with a magnetic stirring bar and distillation column are loaded 38 g of a P(nBA) (Mn=8386, PD=1.21; made analog to example A4), 35 g MPEG-OH (M=500) and 27 g oleyl alcohol (techn. grade). The mixture was heated to 125° C. and 2 g of LiOMe catalyst solution (10 wt % in MeOH) were slowly added. The transesterification was started by slowly distilling off n-butanol under reduced pressure and increasing the temperature to 135° C. Two additional portions each of 2 g catalyst solution were added after 1 h and 2 h later. After 4 h total reaction time the transesterification was terminated after the calculated amount of n-butanol had been distilled off.

78 g of liquid polymer were obtained; Mn=13374, PDI=1.87

Analysis via GPC as well as $^1$H-NMR indicate almost quantitative conversion of the MPEG-OH and the unsaturated oleyl alcohol.

According to analysis via $^1$H-NMR, the degree of polymerization is: P(nBA-MPEGA-OleA)=(32-18-26).

Example A11

Synthesis of a Non-Polar Block Copolymer Poly[(n-BA-iC12-15A)-b-4VP]

In a 250 ml flask equipped with a magnetic stirring bar and distillation column are loaded 83.3 g of a 60 wt % MPA-solution of a diblock copolymer P(nBA-b-4VP) (synthesized analog polymer A5; degree of polymerization=76-b-14, Mn=8834, PD=1.27) and 54.1 g of a branched iso-C12-15-alcohol mixture (Lial 125, Condea). After heating the mixture to 125° C., the MPA was distilled under reduced pressure before adding 0.28 g catalyst solution (Ti(AcAc)2(iOPr)2 Titan-bis-acetylacetonato-bis-isopropylate, 75 wt % in isopropanol). The transesterification was started by slowly distilling off n-Butanol under reduced pressure and increasing the temperature to 145° C. Two additional portions each of 0.28 g catalyst solution were added after 1 h and 2 h later. After 4 h total reaction time the transesterification was terminated after no further n-butanol formation was observed.
76 g of liquid block copolymer were obtained; Mn=12216, PDI=1.27

Analysis via GPC as well as $^1$H-NMR indicated almost quantitative conversion of the MPEG-OH and the branched iC12-C15-alcohol.

According to combined analysis of $^1$H-NMR and GPC, the degree of polymerization is: P[(nBA-iC12-15A)-b-4VP]=(16-60)-b-14.

Example A12

Synthesis of a Block Copolymer Poly(n-BA-b-S)

In a 500 ml flask equipped with a magnetic stirring bar and distillation column are loaded 210 g of a P(nBA) (synthesized analog polymer A4; degree of polymerization=76, Mn=8547, PDI=1.19) and 90 g of styrene and were heated under N2 to 125° C. After 5 h the reaction was terminated and the non-reacted styrene was distilled off at reduced pressure.

175 g of block copolymer were obtained; Mn=11828, PDI=1.21 According to analysis of $^1$H-NMR the degree of polymerization is: P(nBA-b-S)=(75-b-40). The resultant very high viscous block copolymer was diluted with MPA to a clear 60 wt % solution.

Example A13

Synthesis of a Non-Polar Block Copolymer Poly[(n-BA-iC12-15A)-b-S]

In a 250 ml flask equipped with a magnetic stirring bar and distillation column are loaded 50 g of a 60 wt % MPA-solution of the diblock copolymer A12 P(nBA-b-S)=75-b-40) and 26.3 g of a branched iso-C12-15-alcohol mixture (Lial 125, Condea). After heating the mixture to 125° C., the MPA was distilled off under reduced pressure before adding 0.15 g catalyst solution $(Ti(AcAc)_2(iOPr)_2$ Titan-bis-acetylacetonato-bis-isopropylate, 75 wt % in isopropanol). The transesterification was started by slowly distilling off n-Butanol under reduced pressure and increasing the temperature to 145° C. Two additional portions each of 0.15 g catalyst solution were added after 2 h and 4 h later. After 6 h total reaction time the reaction was terminated after no further n-butanol formation was observed.
49 g of liquid block copolymer were obtained; Mn=15072, PDI=1.21

Analysis via GPC as well as $^1$H-NMR indicated good conversion of the branched iC12-C15-alcohol.

According to combined analysis of $^1$H-NMR and GPC, the degree of polymerization is: P[(nBA-iC12-15A)-b-S=(15-60)-b-40.

Example A14

Synthesis of a Block Copolymer Poly(n-BA-b-DMAPMA)

In a 500 ml flask equipped with a magnetic stirring bar and distillation column are loaded 150 g of a P(nBA) (synthesized analog polymer A4; degree of polymerization=76, Mn=8547, PDI=1.19) and 150 g of dimethylaminopropyl methacrylamide (DMAPMA) and were heated under N2 to 145° C. After 4.5 h the reaction was terminated and non-reacted monomer DMAPMA was distilled off at high vacuum.

179 g of block copolymer were isolated; Mn=6874, PDI=1.41 (the apparent molecular weight via GPC appeared lower than the starting precursor)

According to analysis of $^1$H-NMR the degree of polymerization is: P(nBA-b-DMAPMA)=(75-b-23).

The resultant high viscous block copolymer was diluted with MPA to a clear 60 wt % solution.

Example A15

Synthesis of a Non-Polar Block Copolymer Poly[(n-BA-BhA)-b-DMAPMA]

In a 250 ml flask equipped with a magnetic stirring bar and distillation column are loaded 41.7 g of a 60 wt % MPA-solution of the diblock copolymer A14 P(nBA-b-DMAPMA)=75-b-23) and 30.0 g of a technical behenyl alcohol (BhOH=linear C16-22-alcohol mixture Nafol 1822 from Condea). After heating the mixture to 125° C., the MPA was distilled off under reduced pressure before adding 0.15 g catalyst solution $(Ti(AcAc)_2(iOPr)_2$ Titan-bis-acetylacetonato-bis-isopropylate, 75 wt % in isopropanol). The transesterification was started by slowly distilling off n-Butanol under reduced pressure and increasing the temperature to 145° C. Two additional portions each of 0.15 g catalyst solution were added after 2 h and 4 h later. After 6 h total reaction time the reaction was terminated after no further n-butanol formation was observed.

42 g of block copolymer were obtained which solidify at room temperature; Mn=10652, PDI=1.60

Analysis via GPC as well as $^1$H-NMR indicated good conversion of the behenyl alcohol.

According to combined analysis of $^1$H-NMR and GPC, the degree of polymerization is: P[(nBA-BhA)-b-S=(20-55)-b-23.

Example A16

Synthesis of a Block Copolymer Poly(n-BA-b-tBA)

In a 500 ml flask equipped with a magnetic stirring bar and distillation column are loaded 123.4 g of a P(nBA) (synthesized analog polymer A1; degree of polymerization=57, Mn=5866, PDI=1.18) and 211.0 g of tert.-butylacrylate (tBA) and were heated under N2 to 120° C. at gentle reflux. After 16 h the reaction was terminated when solids content was 53% and non-reacted monomer tBA was distilled off in vacuum.
223 g of block copolymer were isolated; Mn=10052, PDI=1.22

According to analysis of $^1$H-NMR the degree of polymerization is: P(nBA-b-tBA)=(57-b-63).

This experiment was repeated several times to produce almost identical block copolymers for further transesterifications.

Example A17

Synthesis of a non-polar block copolymer Poly[(n-BA-BhA)-b-tBA]

In a 500 ml flask equipped with a magnetic stirring bar and distillation column are loaded 288.7 g of the diblock copolymer A16 (P(nBA-b-tBA)=57-b-63) and 186.5 g of a technical behenyl alcohol (BhOH=linear C16-22-alcohol mixture Nafol 1822 from Condea). After heating the mixture to 125° C., 0.15 g catalyst solution $(Ti(AcAc)_2(iOPr)_2$ Titan-bis-acetylacetonato-bis-isopropylate, 75 wt % in isopropanol) were slowly added. The transesterification was started by slowly distilling off n-Butanol under reduced pressure and increasing the temperature to 145° C. Two additional portions each of 0.15 g catalyst solution were added after 2 h and 4 h later. After 6 h total reaction time the reaction was terminated after no further n-butanol formation was observed.

430 g of block copolymer were obtained which solidify at room temperature; Mn=18877, PDI=1.23

Analysis via GPC as well as $^1$H-NMR indicated good conversion of the behenyl alcohol.

Example A18

Synthesis of a Non-Polar Random Copolymer Poly(n-BA-BhA)

In a 250 ml flask equipped with a magnetic stirring bar and distillation column are loaded 85 g of P(nBA) (Mn=8793, PDI=1.20 made analog Polymer A4) and 77 g of a technical behenyl alcohol (BhOH=linear C16-22-alcohol mixture Nafol 1822 from Condea). After heating the mixture to 125° C., 0.43 g catalyst solution $(Ti(AcAc)_2(iOPr)_2$ Titan-bis-acetylacetonato-bis-isopropylate, 75 wt % in isopropanol) were slowly added. The transesterification was started by slowly distilling off n-Butanol under reduced pressure and increasing the temperature to 145° C. Two additional portions each of 0.43 g catalyst solution were added after 2 h and 4 h later. After 6 h total reaction time the reaction was terminated after no further n-butanol formation was observed.

132 g of block copolymer were isolated which solidify at room temperature; Mn=14811, PDI=1.25

Analysis via GPC indicated good conversion of the behenyl alcohol.

B) Application Experiments

1) Application Results with Waterbased Paints

Resin free organic pigment concentrate based on the inventive pigment dispersants and Irgalite Blue PG were prepared according to the following Table 1.

TABLE 1

| compound | w % solids | w % concentrate 1 | W % concentrate 2 | w % concentrate 4 |
|---|---|---|---|---|
| EFKA 4550 | 20 | 12.88 | | |
| Ex. A3 | 35 | | 7.36 | |
| Ex. A6 | 50 | | | 5.15 |
| Irgalite Blue PG | 100 | 16.10 | 16.10 | 16.1 |
| EFKA-2550 | | 0.11 | 0.11 | 0.11 |
| water | | 5.92 | 11.44 | 13.65 |

The organic pigment concentrates from Table 1 are ground for 3 hours with glass beads (2 mm/mb) in a Scandex shaking equipment.

The pigment concentrates based on Irgalite Blue PG are then let down to full tone paints by mixing for 12 h on a roll mill according to the following table.

TABLE 2

| compound | W % full tone 1 | W % full tone 2 | w % full tone 4 |
|---|---|---|---|
| concentrate 1 | 3.14 | | |
| concentrate 2 | | 3.14 | |
| concentrate 3 | | | 3.14 |
| AW 666$^a$ | 38.43 | 38.43 | 38.43 |
| butylglycole/water (1/9) | 3.43 | 3.43 | 3.43 |

$^a$15.1 w % solids acrylic binder

EFKA 4550 is a commercial water based acrylic pigment dispersant from EFKA Additives
EFKA 2550 is a commercial defoamer from EFKA Additives
Acticide LG is a commercial biocide from Acti-Chem Specialties
AW 666 is a commercial water based acrylic binder autowave 666 from Akzo Nobel Coatings Viscosity of pigment concentrate and full tone, transparency of dry full tone and gloss at 20° after letdown is measured.

TABLE 3

| | concentrate 1 | concentrate 2 | concentrate 4 |
|---|---|---|---|
| Viscosity [MPas] at 1 1/s | 1580 | 264 | 152 |
| Viscosity [Mpas] at 1000 1/s | 131 | 66 | 41 |

TABLE 3-continued

| | concentrate 1 | concentrate 2 | concentrate 4 |
|---|---|---|---|
| Viscosity ratio 1/1000 | 12 | 4 | 4 |

TABLE 4

| | fulltone 1 | fulltone 2 | fulltone 4 |
|---|---|---|---|
| Viscosity [MPas] at 1 1/s | 9670 | 9550 | 9310 |
| Viscosity [Mpas] at 1000 1/s | 81 | 79 | 79 |
| Viscosity ratio 1/1000 | 120 | 120 | 118 |

TABLE 5

| | fulltone 1 | fulltone 2 | fulltone 4 |
|---|---|---|---|
| Transparency *) | 0 | 1 | 0 |
| gloss 20° | 67 | 61 | 73 |

*) visual rating for transparency: 0 = very good, 5 = poor transparency

These results demonstrate, that the novel polymers prepared by CFRP and modified by transesterification show good performance as pigment dispersants in waterborne paint systems.

2) Application Results of Non-Polar Copolymers as Levelling Agent in Powder Coatings Example 1

White Pigmented Powder Coatings Based on a Carboxyl-Functional Polyester and a Hydroxyalkylamide as a Hardener The powder coating composition is based on a carboxyfunctional polyester, components 1 to 6 (formulation containing the levelling agent) as indicated in Table 1.

| Components | | |
|---|---|---|
| | 1.1 comparative | 1.2 |
| 1. Crylcoat ® 2532$^{a)}$ | 349.9 | 352.5 |
| 2. Primid ® XL 552$^{b)}$ | 14.4 | 14.5 |
| 3. Ceridust ® 9615$^{c)}$ | 1 | 1 |
| 4. Benzoin$^{d)}$ | 2 | 2 |
| 5. Kronos ® 2160$^{e)}$ | 125 | 125 |
| 6. Levelling agent | 7.7$^{f)}$ | 5$^{g)}$ |
| Total: | 500 | 500 |

$^{a)}$Crylcoat ® 2532 from UCB S.A., Drogenbos, Belgium
$^{b)}$Primid ® XL 552 from EMS, Domat, Switzerland
$^{c)}$Ceridust ® 9615 from Clariant AG, Muttenz, Switzerland
$^{d)}$Benzoin from Fluka AG
$^{e)}$Kronos ® 2160 from Kronos, Germany
$^{f)}$Modaflow ® P 3 from UCB Surface Specialties, USA, commercial levelling agent
$^{g)}$Polymer A18

The components are mixed using a planetary stirrer. The mixture is then extruded on a prism extruder at 300 revolutions/minute at 110° C. and is rolled out. The powder coating composition is coarsely comminuted using a bench cutter and is ground in a Retsch ZM-1 ultracentrifugal mill with a 0.75 mm annular-perforation screen at 15,000 revolutions/minute.

Finally, the powder is passed through a 125 µm sieve on a centrifugal sieving machine having an average particle size of from 30 to 50 µm.

The finished powder coating composition is sprayed electrostatically to a coat thickness of 70 to 80 µm onto aluminium panels using an ESB-Wagner corona cup gun at 60 kV. The coated panels are cured in an electric oven at 200° C. for 10 minutes.

The following parameters are determined:
1) yellowness: b* ISO 7724 (ASTM D 2244). Large values of b* denote strong yellowing.
2) gloss @ 20° measured with a BYK Gardner haze-gloss in accordance with the manufacturer's suggested method of operation. High gloss values indicate high reflectance of the coating films.
3) DOI (BYK) with a BYK Gardner wave-scan DOI in accordance with the manufacturer's suggested method of operation. While a DOI value at zero is for a perfect diffusion, a DOI value of 100 means a perfect mirror image indicating a very smooth surface.
4) Longwave with a BYK Gardner wave-scan DOI in accordance with the manufacturer's suggested method of operation. Longwave values of lesser magnitude are indicative for coatings that are smoother in appearance.

TABLE 2

Results after curing for 10 minutes at 180° C.

| Example | Flow agent | b* | Gloss @ 20° | Longwave | DOI |
|---------|------------|-----|-------------|----------|-----|
| 1.1 | Modaflow P3 | 6 | 88 | 42 | 81 |
| 1.2 | Polymer A18 | 5 | 82 | 44 | 83 |

These results demonstrate that the inventive polymer A18 modified by transesterification shows improved performance compared to a commercial benchmark.

Example 2

Non-Pigmented Powder Coatings Based on GMA-Acrylic and DDDA as Hardener

All powder coatings are prepared and their parameters are determined as described in Example 1.

| Components | | |
|------------|-----------------|------|
|  | 2.1 comparative | 2.2 |
| 1. Almatex ® PD7610[a] | 550.1 | 553 |
| 2. DDDA[b] | 118.4 | 119 |
| 3. Tinuvin ® 144[c] | 7.0 | 7.0 |
| 4. Tinuvin ® 405[d] | 14.0 | 14.0 |
| 5. Benzoin[e] | 3.5 | 3.5 |
| 6. Levelling agent | 7.0[f] | 3.5[g] |
| Total: | 1000 | 1010 |

[a]Almatex ® PD7610 from Anderson, USA
[b]Dodecanedioic acid from DuPont, Germany
[c]Tinuvin ® 144 from Ciba Specialty Chemicals, Basel, Switzerland
[d]Tinuvin ® 405 from Ciba Specialty Chemicals, Basel, Switzerland
[e]Benzoin
[f]Additol ® XL 490 from UCB Surface Specialties, USA
[g]A17

TABLE 6

Results after curing for 30 minutes at 140° C.

| Example | Flow agent | b* | Gloss @ 20° | Longwave | DOI |
|---------|-------------|-----|-------------|----------|-----|
| 2.1 | Additol XL 490 | 0.7 | 84 | 22 | 88 |
| 2.2 | Polymer A17 | 0.7 | 86 | 17 | 92 |
| (DFT = 50 µm) | | | | | |

DFT = Dry Film Thickness

These results demonstrate that the inventive block copolymer A17 shows comparable performance at lower dosage compared to a commercial benchmark levelling agent. In addition it has a solid 100% active product form, which is more convenient in handling and what offers significant advantages in production of powder paints. Usual commercial polyacrylate levelling agents are either liquid or sticky resins or are adsorbed on solid silica carrier.

3) Application Testing for Non-Polar Formulations

Commercial polyacrylate pigment dispersants are not fully soluble in non-polar solvents like pure aliphatic hydrocarbons. The solubility of the inventive copolymers was tested in an aliphatic hydrocarbon solvent Shell Catenex 925, which serves as a model for extreme non-polar formulations.

At 10 wt % polymer the inventive copolymers A11, A13 and A15 showed full solubility. This is in contrast to typical commercial polyacrylate dispersants like Efka-4401, which was tested in comparison and formed turbid inhomogeneous mixture.

The invention claimed is:
1. A process for the preparation of a modified block copolymer comprising the steps
a1) polymerizing in a first step ethylenically unsaturated monomers in the presence of at least one nitroxylether having the structural element

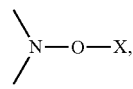

wherein X represents a group having at least one carbon atom and is such that the free radical X. derived from X is capable of initiating polymerization; or
a2) polymerizing in a first step ethylenically unsaturated monomers in the presence of at least one stable free nitroxyl radical

and a free radical initiator; and in a second step
b) modifying the block copolymer prepared under a1) or a2) by a transesterification reaction with a mono alcohol derived from ethylenoxide, propylenoxide or mixtures thereof with up to 100 C atoms,
wherein a1) or a2) is carried out in two radical polymerization steps to form a block copolymer wherein in the first polymerization step the monomers are $C_1$-$C_6$ alkyl esters of acrylic or methacrylic acid and in the second polymerization step the monomers are 4-vinylpyridine or pyridinium-ion, 2-vinylpyridine or pyridinium-ion, vinyl-imidazole or imidazolinium-ion, dimethylacrylamide, 3-dimethylaminopropylmethacrylamide or mixtures thereof.

2. A process according to claim 1 comprising step a1).

3. A process according to claim 1 wherein the block copolymer is a gradient block copolymer.

4. A process according to claim 1 comprising step a1) wherein the structural element

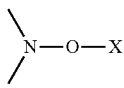

is a structural element of formula (I)

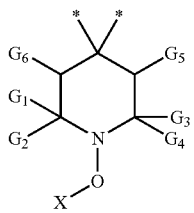

wherein $G_1$, $G_2$, $G_3$, $G_4$ are independently $C_1$-$C_6$alkyl or $G_1$ and $G_2$ or $G_3$ and $G_4$, or $G_1$ and $G_2$ and $G_3$ and $G_4$ together form a $C_5$-$C_{12}$cycloalkyl group;

$G_5$, $G_6$ independently are H, $C_1$-$C_{18}$alkyl, phenyl, naphthyl or a group $COOC_1$-$C_{18}$alkyl;

X is selected from the group consisting of —$CH_2$-phenyl, $CH_3CH$-phenyl, $(CH_3)_2C$-phenyl, $(C_5$-$C_6$cycloalkyl$)_2$CCN, $(CH_3)_2$CCN,

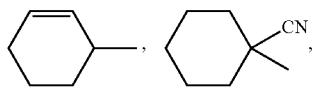

—$CH_2CH{=}CH_2$, $CH_3CH$—$CH{=}CH_2$ ($C_1$-$C_4$alkyl)$CR_{20}$—C(O)-phenyl, ($C_1$-$C_4$)alkyl-$CR_{20}$—C(O)—($C_1$-$C_4$)alkoxy, ($C_1$-$C_4$)alkyl-$CR_{20}$—C(O)—($C_1$-$C_4$)alkyl, ($C_1$-$C_4$)alkyl-$CR_{20}$—C(O)—N-di($C_1$-$C_4$)alkyl, ($C_1$-$C_4$)alkyl-$CR_{20}$—C(O)—NH($C_1$-$C_4$)alkyl and ($C_1$-$C_4$)alkyl-$CR_{20}$—C(O)—$NH_2$, wherein $R_{20}$ is hydrogen or ($C_1$-$C_4$)alkyl and

*denotes a valence.

5. A process according to claim 1 comprising step a2) wherein the structural element

is a structural element of formula (II)

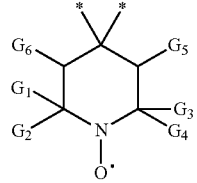

wherein $G_1$, $G_2$, $G_3$, $G_4$ are independently $C_1$-$C_6$alkyl or $G_1$ and $G_2$ or $G_3$ and $G_4$, or $G_1$ and $G_2$ and $G_3$ and $G_4$ together form a $C_5$-$C_{12}$cycloalkyl group;

$G_5$, $G_6$ independently are H, $C_1$-$C_{18}$alkyl, phenyl, naphthyl or a group $COOC_1$-$C_{18}$alkyl.

6. A process according to claim 1 comprising step a1) and wherein the nitroxylether is a compound of formula (O1)

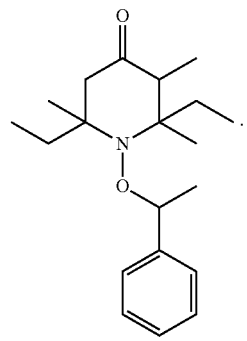

7. A process according to claim 1 where the modified block copolymer is a modified copolymer of n-butylacrylate and 4-vinylpyridine.

8. A process according to claim 1 wherein the alcohol is an ethoxylate of formula (A)

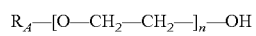

wherein $R_A$ is a saturated or unsaturated, linear or branched chain alkyl with 1-22 carbon atoms, or is an alkylaryl or dialkylaryl with up to 24 carbon atoms and n is 1 to 50.

9. A modified block copolymer obtained by a process comprising the steps a1) polymerizing in a first step ethylenically unsaturated monomers in the presence of at least one nitroxylether having the structural element

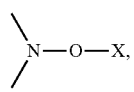

wherein X represents a group having at least one carbon atom and is such that the free radical X. derived from X is capable of initiating polymerization; or a2) polymerizing in a first step ethylenically unsaturated monomers in the presence of at least one stable free nitroxyl radical

and a free radical initiator; and in a second step
- b) modifying the block copolymer prepared under a1) or a2) by a transesterification reaction with a mono alcohol derived from ethylenoxide, propylenoxide or mixtures thereof with up to 100 C atoms, wherein a1) or a2) is carried out in two radical polymerization steps to form a block copolymer wherein in the first polymerization step the monomers are $C_1$-$C_6$ alkyl esters of acrylic or methacrylic acid and in the second polymerization step the monomers are 4-vinylpyridine or pyridinium-ion, 2-vinylpyridine or pyridinium-ion, vinyl-imidazole or imidazolinium-ion, dimethylacrylamide, 3-dimethylaminopropylmethacrylamide or mixtures thereof.

10. A pigment concentrate comprising
    a) a pigment and
    b) a modified copolymer according to claim 9.

11. A composition comprising
    a) a thermoplastic, chemically crosslinked or structurally crosslinked polymer and
    b) a modified copolymer according to claim 9 and
    organic or inorganic pigments or mixtures thereof.

12. A composition according to claim 11 wherein component a) is a film forming binder material.

13. A modified block copolymer according to claim 9 where the process comprises step a1).

14. A modified block copolymer according to claim 9 which is a gradient block copolymer.

15. A modified block copolymer according to claim 9 where the process comprises step a1) wherein the structural element

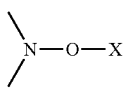

is a structural element of formula (I)

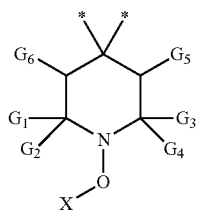

(I)

wherein
$G_1$, $G_2$, $G_3$, $G_4$ are independently $C_1$-$C_6$alkyl or $G_1$ and $G_2$ or $G_3$ and $G_4$, or $G_1$ and $G_2$ and $G_3$ and $G_4$ together form a $C_5$-$C_{12}$cycloalkyl group;
$G_5$, $G_6$ independently are H, $C_1$-$C_{18}$alkyl, phenyl, naphthyl or a group COO$C_1$-$C_{18}$alkyl;
X is selected from the group consisting of —$CH_2$-phenyl, $CH_3$CH-phenyl, $(CH_3)_2$C-phenyl, $(C_5$-$C_6$cycloalkyl$)_2$CCN, $(CH_3)_2$CCN,

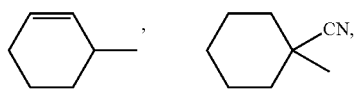

—$CH_2CH=CH_2$, $CH_3CH$—$CH=CH_2(C_1$-$C_4$alkyl)$CR_{20}$—C(O)-phenyl, $(C_1$-$C_4)$alkyl-$CR_{20}$—C(O)—$(C_1$-$C_4)$alkoxy, $(C_1$-$C_4)$alkyl-$CR_{20}$—C(O)—$(C_1$-$C_4)$alkyl, $(C_1$-$C_4)$alkyl-$CR_{20}$—C(O)—N-di$(C_1$-$C_4)$alkyl, $(C_1$-$C_4)$alkyl-$CR_{20}$—C(O)—NH$(C_1$-$C_4)$alkyl and $(C_1$-$C_4)$alkyl-$CR_{20}$—C(O)—$NH_2$, wherein $R_{20}$ is hydrogen or $(C_1$-$C_4)$alkyl and
*denotes a valence.

16. A modified block copolymer according to claim 9 where the process comprises step a2) wherein the structural element

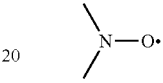

is a structural element of formula (II)

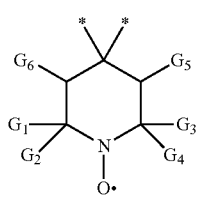

(II)

wherein
$G_1$, $G_2$, $G_3$, $G_4$ are independently $C_1$-$C_6$alkyl or $G_1$ and $G_2$ or $G_3$ and $G_4$, or $G_1$ and $G_2$ and $G_3$ and $G_4$ together form a $C_5$-$C_{12}$cycloalkyl group;
$G_5$, $G_6$ independently are H, $C_1$-$C_{18}$alkyl, phenyl, naphthyl or a group COO$C_1$-$C_{18}$alkyl.

17. A modified block copolymer according to claim 9 where the process comprises step a1) and wherein the nitroxyl ether is a compound of formula (O1)

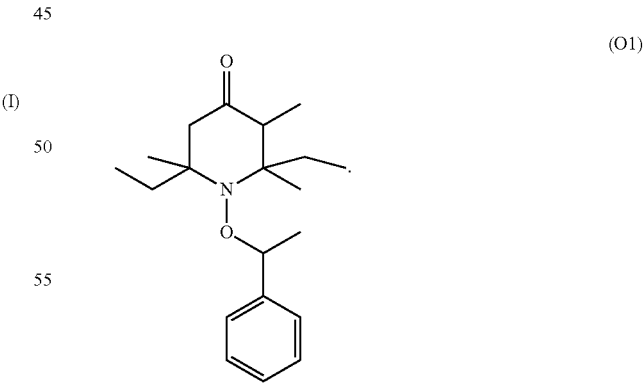

(O1)

18. A modified block copolymer according to claim 9 which is a modified copolymer of n-butylacrylate and 4-vinylpyridine.

19. A modified block copolymer according to claim 9 wherein the alcohol is an ethoxylate of formula (A)

$$R_4—[O—CH_2—CH_2—]_n—OH \quad (A)$$

wherein $R_4$ is a saturated or unsaturated, linear or branched chain alkyl with 1-22 carbon atoms, or is an alkylaryl or dialkylaryl with up to 24 carbon atoms and n is 1 to 50.

20. A pigment concentrate according to claim 10, where the pigment is selected from the group consisting of 1-aminoanthraquinone, anthanthrone, anthrapyrimidine, azo, azomethine, quinacridone, quinacridonequinone, quinophthalone, doxazine, diketopyrrolopyrrole, flavanthrone, inanthrone, isoindoline, isoindolinone, isoviolanthrone, perinone, perylene, phthalocyanine, pyranthrone, thioindigo and carbon black pigments.

21. A pigment concentrate according to claim 10, where the pigment is selected from the group consisting of quinacridone, dioxazine, perylene, diketopyrrolopyrrole, disazo condensation and carbon black pigments.

* * * * *